(12) United States Patent
Kurata et al.

(10) Patent No.: US 8,210,730 B2
(45) Date of Patent: Jul. 3, 2012

(54) SURFACE LIGHT SOURCE DEVICE

(75) Inventors: Gouo Kurata, Kusatsu (JP); Kazuhide Hirota, Moriyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 13/163,298

(22) Filed: Jun. 17, 2011

(65) Prior Publication Data

US 2011/0286238 A1    Nov. 24, 2011

Related U.S. Application Data

(63) Continuation of application No. PCT/JP2009/006468, filed on Nov. 30, 2009.

(30) Foreign Application Priority Data

Dec. 17, 2008  (JP) .................................. 2008-320480

(51) Int. Cl.
*G02F 1/1335*    (2006.01)

(52) U.S. Cl. ........ 362/606; 362/610; 362/612; 362/616; 362/628; 362/97.2

(58) Field of Classification Search .................. 362/610, 362/606, 612, 613, 616, 621, 628, 97.2, 97.3, 362/615, 625
See application file for complete search history.

(56) References Cited

U.S. PATENT DOCUMENTS

| | | | | |
|---|---|---|---|---|
| 6,942,374 B2 * | 9/2005 | Lee | ................................ | 362/615 |
| 7,018,087 B2 * | 3/2006 | Yoo | ................................ | 362/615 |
| 7,677,783 B2 * | 3/2010 | Wei et al. | ...................... | 362/612 |
| 2007/0127263 A1 * | 6/2007 | Chang | ........................... | 362/610 |
| 2009/0059127 A1 * | 3/2009 | Nakamoto et al. | .............. | 349/65 |
| 2011/0013418 A1 * | 1/2011 | Kanade et al. | ................ | 362/606 |

FOREIGN PATENT DOCUMENTS

| | | |
|---|---|---|
| JP | 5-53111 A | 3/1993 |
| JP | 2003-272428 A | 9/2003 |
| JP | 2004-069751 A | 3/2004 |
| JP | 2005-285389 A | 10/2005 |
| JP | 2008-015467 A | 1/2008 |
| WO | 2008/153024 A1 | 12/2008 |
| WO | 2010/070823 A1 | 6/2010 |

OTHER PUBLICATIONS

International Search Report w/translation from PCT/JP2009/006468 dated Feb. 16, 2010 (2 pages).
Written Opinion from PCT/JP2009/006468 dated Feb. 16, 2010 (3 pages).

\* cited by examiner

*Primary Examiner* — Jong-Suk (James) Lee
*Assistant Examiner* — Leah S Macchiarolo
(74) *Attorney, Agent, or Firm* — Osha • Liang LLP

(57) ABSTRACT

A light guide plate includes a light introducing portion which is positioned facing a point light source and which confines light, and a light guide plate body which is thinner than a maximum thickness of the light introducing portion and which causes a light exit means to emit the confined light outward. The light introducing portion has an inclined face which is inclined from a portion having the maximum thickness to a surface of the light guide plate body. The inclined face includes a directivity converting pattern for converting a directional characteristic of the light that has entered the light introducing portion. The directivity converting pattern's structure includes a plurality of V-shaped grooves. An inscribed circle of the directivity converting pattern passes through both ends of a light exit window of the point light source.

10 Claims, 36 Drawing Sheets

SURFACE LIGHT SOURCE DEVICE

BACKGROUND OF INVENTION

1. Technical Field

One or more embodiments of the present invention relate to a surface light source device and, more particularly to a structure of a surface light source device for causing light to enter a light guide plate body thinner than the thickness of a light source efficiently.

2. Background Art

A surface light source device is required to have uniform luminance, to have high luminance, and to be low in cost, as well as to have a large light-emitting area (have a small non-light-emitting area) and to be thin. In particular, in a case where the surface light source is incorporated in a portable device, demand for thinning of the surface light source device is increasingly high according to thinning of the portable device.

In an edge-light type surface light source device, however, a point light source is disposed opposite to an end face of the light guide plate, and therefore, if the thickness of the light guide plate is made thinner than the height of a light exit window of the point light source, light not entering the light guide plate of light emitted from the point light source increases, and light-use efficiency of the surface light source device is reduced accordingly. Thus, the thickness of the light guide plate is restricted by the height of the light exit window of the point light source, and it is difficult to make the thickness of the light guide plate thinner than the height of the light exit window of the point light source accordingly. Similarly, in a case where the light source is a cold-cathode-fluorescent tube, it is difficult to make the thickness of the light guide plate thinner than the diameter of the cold-cathode tube.

(Regarding Patent Document 1)

In a liquid crystal display device disclosed in Japanese Unexamined Patent Application Publication No. 1993-53111 (Patent Document 1), in order to cause light from a fluorescent tube to efficiently enter a light guide plate thinner than the fluorescent tube, a tapered portion is provided at a thin portion of the light guide plate, namely, an end portion of a light guide plate body. An end face of the tapered portion has a height approximately equal to the diameter of the fluorescent tube, and the fluorescent tube faces the end face.

In such a liquid crystal display device, the thickness of the light guide plate body can be made thinner than the diameter of the fluorescent tube, so that light entering through the end face of the tapered portion is totally reflected by front and back faces of the tapered portion to be guided into the light guide plate body, and emitted from an upper face of the light guide plate body toward a liquid crystal panel.

In such a liquid crystal display device as described in the patent document 1, however, light leakage at the tapered portion cannot be prevented, and accordingly the light leaking from the tapered portion appears bright on an observer's side, and therefore an edge of a display portion (screen) of the liquid crystal display device emits light with high luminance to deteriorate the quality of the display portion. Even if the light leakage could have been prevented, in that case, the thickness of the light guide plate body cannot be made much thin as compared with the thickness of the tapered portion, or the length of the tapered portion must be made very long, which results in reduction of a light-emitting area.

(Regarding Patent Documents 2 and 3)

Japanese Unexamined Patent Application Publication No. 2004-69751 (Patent Document 2) and Japanese Unexamined Patent Application Publication No. 2005-285389 (Patent Document 3) also disclose surface light source devices. In the surface light source device described in the patent document 2, however, light leaking out of the light guide plate cannot sufficiently be suppressed, and accordingly the leaked light shines on a display face of the liquid crystal display device to deteriorate the quality of the liquid crystal display device. Further, in the surface light source device described in the patent document 3, light is absorbed by a light reflecting plate, or light reflected by the light reflecting plate leaks from a light entering end face, which results in deterioration of light-use efficiency.

Incidentally, issues dealing with the surface light source devices of the patent documents 1, 2, and 3 are described in detail in a patent document 4.

(Regarding Patent Document 4)

Therefore, in the PCT application previously filed (PCT/JP2008/60610: Patent Document 4), the applicant of the present invention discloses a surface light source device that can make the thickness of the light guide plate body sufficiently thinner than the height of the light entering end face, and can further reduce light leakage from a tapered light introducing portion.

As shown in FIG. 1, the surface light source device 31 includes a point light source 32 using an LED, and a light guide plate 33. The light guide plate 33 includes a light introducing portion 35 provided at an end portion of a light guide plate body 34, and formed from transparent resin with a high refractive index. The light introducing portion 35 is thicker than the light guide plate body 34, and the point light source 32 is disposed so as to face an end face of the light introducing portion 35. On a face of the light guide plate body 34 positioned on the same side as a light exit face 39, a projecting portion having the shape of approximately a half of a circular truncated cone projects to increase the thickness of the light introducing portion 35. A peripheral face of the projecting portion forms an inclined face 37, and a directivity converting pattern 38 is formed on the inclined face 37. The directivity converting pattern 38 is obtained by arranging fine V-shaped groove structures 41 along the inclined face 37. When viewed from a direction perpendicular to the light exit face 39 of the light guide plate 33, the directivity converting pattern 38 constitutes a region having the shape of an arc around the center of a light exit window of the point light source 32 (near the center of the light source), and extended lines (longitudinal axes) in extending directions of the respective V-shaped groove structures 41 converge near the center of the light source. Note that on a face (back face) opposite to the light exit face 39 of the light guide plate body 34, many prismatic light emitting means 40 (see FIG. 2) are concentrically formed to reflect light guided in the light guide plate body 34 and emit the same from the light exit face 39.

Thus, as shown in FIG. 2, in the surface light source device 31, light L emitted from the point light source 32 enters the light introducing portion 35 from the light entering end face 36, is totally reflected by the directivity converting pattern 38 or a bottom face of the light introducing portion 35, or passes through the light introducing portion 35, and is guided to the thin light guide plate body 34. The light guided to the light guide plate body 34 is totally reflected or diffused by the light emitting means 40, and emitted approximately uniformly from the light exit face 39.

In the surface light source device 31 thus structured, light leakage from the light guide plate 33 can be eliminated in a plane perpendicular to the light exit face 39, for example, when setting is made in the following manner.

Refractive index of the light guide plate 33 n=1.59

Vertex angle of a ridge portion of the directivity converting pattern 38 φ=120°

Thickness of the end face of the light introducing portion 35 T=0.31 mm

Thickness of the light guide plate body 34 t=0.18 mm

Length of an upper face of the light introducing portion 35 s1=2.50 mm

Length of the light introducing portion 35 s2=3.19 mm

Inclination angle of the inclined face 37 θ=15.3°

Further, in a plan view of the light introducing portion 35 shown in FIG. 3A, an angle (hereinafter referred to as one-sided angle of view) ∠APC between a line segment AP connecting one end A of a light exit window 32a of the point light source 32 and the center P on the edge of the inner periphery of the directivity converting pattern 38 and a line segment CP connecting the center C of the light exit window 32a and the center P on the edge of the inner periphery of the directivity converting pattern 38 is set at 20°. Further, an angle (hereinafter referred to as one-sided angle of view) ∠BPC between a line segment BP connecting the other end B of the light exit window 32a of the point light source 32 and the center P on the edge of the inner periphery of the directivity converting pattern 38 and a line segment CP connecting the center C of the light exit window 32a and the center P on the edge of the inner periphery of the directivity converting pattern 38 is also set at 20°. In this example, an area occupied by the light introducing portion 35 increases, and a dead space S in the light guide plate 33 increases accordingly. However, lateral expansion of light incident on the center P of the directivity converting pattern 38 becomes 20° on each side of the centerline CP, lateral expansion of light outside the center P of the directivity converting pattern 38 is smaller than that, and therefore light leakage can be prevented by the whole of the directivity converting patter 38, so that leakage light in a plane parallel to the light exit face 39 is significantly reduced, and the percentage of maximum leakage light can be limited to 2% (that is, (leakage light)/(input light)≦2%).

Therefore, in the surface light source device 31 disclosed in the patent document 4, even if the inclination angle θ of the inclined face 37 is as large as 15.3°, light leakage from the light guide plate 33 can be significantly reduced by setting the one-sided angle of view of the light introducing portion 35 at 20°. Further, even if the one-sided angle of view is larger than 20°, it is possible to allow less leakage light by making the one-sided angle of view as smaller as possible.

However, in the market of surface light source devices, as well as the demand for thinning, demand for a light guide plate with a smaller dead space is increasing. Hence, for actual commercialization of product of the surface light source device, consideration is required to be made to reduce an area occupied by the light introducing portion.

The area occupied by the light introducing portion 35 can be reduced by designing the directivity converting pattern 38 to have a larger one-sided angle of view. For example, in the light introducing portion 35 shown in FIG. 3B, the one-sided angle of view ∠APC between the line segment AP connecting the one end A of the light exit window 32a of the point light source 32 and the center P on the edge of the inner periphery of the directivity converting pattern 38 and the line segment CP connecting the center C of the light exit window 32a and the center P on the edge of the inner periphery of the directivity converting pattern 38 is set at 30°. Similarly, the one-sided angle of view ∠BPC is also set at 30°. When the case shown in FIG. 3B where the one-sided angles of view ∠APC and ∠BPC are 30° and the case shown in FIG. 3A where they are 20° are compared with each other, in the case where the one-sided angles of view are 30° a dead space S for the light introducing portion 35 can be made smaller, but on the other hand the leakage light increases to a percentage of the maximum leakage light of 15% ((leakage light)/(input light) ≦15%).

Furthermore, when the one-sided angle of view is 40°, the dead space can be smaller than that in the case of 30°, but the leakage light increases more than that in the case of 30°, and accordingly the percentage of the maximum leakage light becomes even higher than 15%.

An actual surface light source device is desired to have a smaller dead space even if the leakage light is sacrificed to some extent, but when the leakage light reaches about 15%, the light-use efficiency of the surface light source device decreases to cause reduction in luminance of a light emitting face (light exit face 39), and, as shown in FIG. 4, the light leaking from the directivity converting pattern 38 creates a light-emitting region J having high luminance at the edge of the light introducing portion 35, resulting in deterioration in quality of the surface light source device 31. Therefore, the leakage light should practically be limited to about 15% at the most, and accordingly, in the surface light source device 31 of the patent document 4, the dead space S cannot be reduced by making the area occupied by the light introducing portion 35 smaller than that in the case where the one-sided angle of view is 30°.

CITATION LIST

Patent Document

Patent Document 1: Japanese Unexamined Patent Application Publication No. 1993-53111
Patent Document 2: Japanese Unexamined Patent Application Publication No. 2004-69751
Patent Document 3: Japanese Unexamined Patent Application Publication No. 2005-285389
Patent Document 4: PCT/JP2008/60610

SUMMARY OF INVENTION

One or more embodiments of the present invention relate to improvement of the surface light source device disclosed in the patent document 4, and an object thereof is to further improve the light-use efficiency of the surface light source device by further reducing light leakage, especially when the dead space due to the light introducing portion is the same.

The surface light source device according to one or more embodiments of the present invention is a surface light source device provided with a point light source, and a light guide plate which introduces light of the point light source therein from a light entering face and emits the same outward from a light exit face, wherein the point light source is provided at a position facing the light entering face of the light guide plate; the light guide plate includes a light introducing portion for confining the light from the point light source that has entered from the light entering face, and a light guide plate body which is thinner than a maximum thickness of the light introducing portion, which is so provided as to be continuous with the light introducing portion, and which causes a light exit means to emit the confined light from the light exit face outward; the light introducing portion has an inclined face on a face on a light exit side of the light guide plate or the opposite face thereof, the inclined face being inclined to an end of a surface of the light guide plate body from a surface of a portion thicker than the light guide plate body; the light guide plate has a directivity converting pattern on the face on the light exit side or the opposite face, the directivity converting pattern being for converting a directional expansion in a thickness direction of the light guide plate of the light that has entered the light introducing portion into a directional characteristic that has been inclined to a direction parallel to a planer direction of the light guide plate; the directivity converting pattern is composed of an arrangement of a plurality of unit patterns of recesses or projections, each of which extends in one direction; and when the light guide plate is viewed from a direction perpendicular to the light exit face, both a first point of intersection which is located within a region which the light which has entered the light guide plate from the light entering face reaches and at which a first straight line obtained by averaging respective longitudinal axes of the unit patterns which are located on one side of a centerline of the point light source intersects with the centerline and a second point of intersection which is located within the region which the light which has entered the light guide plate from the light entering face reaches and at which a second straight line obtained by averaging respective longitudinal axes of the unit patterns which are located on the other side of the centerline of the point light source intersects with the centerline are located behind a light source center of the point light source.

Here, the light source center of the point light source means a center between both ends of the light exit window of the point light source. The centerline of the point light source means an axial line which is perpendicular to a direction connecting both the ends of the light exit window and which passes through the light source center. The longitudinal axis of the unit pattern means a straight line in a longitudinal direction in which the unit pattern extends, or an extended line thereof. Further, "behind the light source center of the point light source" means "on a side opposite to the directivity converting pattern regarding the light exit window".

Further, the straight line obtained by averaging longitudinal axes of the respective unit patterns is defined as follows. When viewed from a direction perpendicular to the light exit face of the light guide plate, the light source center is defined as a coordinate origin, a direction parallel to a front face of the point light source is defined as an X-coordinate axis, and a direction perpendicular to the front face of the point light source is defined as a Y-coordinate axis. At this time, the longitudinal axis of each unit pattern is expressed as $X = a_n \cdot Y + b_n$, then the averaged straight line is expressed as $X = [(\Sigma a_n)/N] \cdot Y + [(\Sigma b_n)/N]$.

The subscript n is an index to identify each unit pattern, the summation denoted by $\Sigma$ is performed on all unit patterns to be handled. N is a number of unit patterns to be handled, and $N = \Sigma 1$.

Further, a Y-coordinate at a point of intersection between the averaged straight line and the centerline is $-(\Sigma b_n)/(\Sigma a_n)$.

According to the surface light source device of one or more embodiments of the present invention, for a large majority of the unit patterns existing in a region which the light that has entered the light guide plate from the light entering face reaches, expansions of light incident on the unit pattern from the point light source become approximately equal to each other on both sides of the longitudinal axis of the unit pattern, and therefore, if a dead space due to the light introducing portion is the same, the light-use efficiency is further improved as compared with that in the surface light source device disclosed in the patent document 4. Therefore, if the light introducing portion has the same efficiency, the dead space due to the light introducing portion can be reduced, and accordingly a ratio of a light-emitting area can be increased. Further, light leakage from the light introducing portion can be reduced so that the light introducing portion or a potion in the vicinity thereof is prevented from shining.

In one or more embodiments of the surface light source device according to the present invention, a distance between the first point of intersection and the light source center is equal to or less than six times a width of a light exit window of the point light source; and a distance between the second point of intersection and the light source center is equal to or less than six times the width of the light exit window of the point light source. According to one or more embodiments, the percentage of maximum leakage light can be made optimum, and equal to or less than 15%, which is an allowable limit.

In one or more embodiments of the surface light source device according to the present invention, the first point of intersection and the second point of intersection coincide with each other. According to one or more embodiments, optical characteristics of the light entering portion are equal in regions on one side and the other side of the centerline of the point light source, and therefore luminance of the surface light source device can be made equal on both the sides of the centerline.

In one or more embodiments of the surface light source device according to the present invention, when the light guide plate is viewed from the direction perpendicular to the light exit face, the longitudinal axes of the respective unit patterns located in the region which the light that has entered the light guide plate from the light entering face reaches converge near a point located behind the light source center of the point light source. According to one or more embodiments, expansions of light incident on the unit pattern from the point light source become approximately equal on both sides of the longitudinal axis of the unit pattern for almost all of the unit patterns located in the region which the light that has entered the light guide plate from the light entering face reaches, and therefore, the light-use efficiency is further improved as compared with that in the surface light source device disclosed in the patent document 4. Therefore, if the light introducing portion has the same efficiency, the dead space due to the light introducing portion can be reduced, and accordingly a ratio of a light-emitting area can be increased. Further, light leakage from the light introducing portion can be reduced so that the light introducing portion or a potion in the vicinity thereof is prevented from shining.

In one or more embodiments of the surface light source device according to the present invention, when the light guide plate is viewed from the direction perpendicular to the light exit face, all points at which the longitudinal axes of the respective unit patterns located in the region which the light that has entered the light guide plate from the light entering face reaches intersect with the centerline are located behind the light source center of the point light source. According to one or more embodiments, for almost all of the unit patterns existing in a region which the light that has entered the light guide plate from the light entering face reaches, expansions of light incident on the unit pattern from the point light source become approximately equal on both sides of the longitudinal axis of the unit pattern, and therefore the light-use efficiency is further improved as compared with that in the surface light source device disclosed in the patent document 4. Therefore, if the light introducing portion has the same efficiency, the dead space due to the light introducing portion can be reduced, and accordingly a ratio of a light-emitting area can be increased. Further, light leakage from the light introducing portion can be reduced so that the light introducing portion or a potion in the vicinity thereof is prevented from shining.

In one or more embodiments of the surface light source device according to the present invention, when the light guide plate is viewed from the direction perpendicular to the light exit face, distances between points at which the longitudinal axes of the respective unit patterns located in the region which the light that has entered the light guide plate from the light entering face reaches intersect with the centerline and the light source center are equal to or less than six times a width of a light exit window of the point light source. According to one or more embodiments, the percentage of maximum leakage light can be made optimum, and equal to or less than 15%, which is an allowable limit.

In one or more embodiments of the surface light source device according to the present invention, when the light guide plate is viewed from the direction perpendicular to the light exit face, points at which the longitudinal axes of the unit patterns located in the region which the light that has entered the light guide plate from the light entering face reaches intersect with the centerline are closer to the light source center of the point light source as the unit patterns have farther distances from the centerline. Particularly, in this case, it is desired that, when the light guide plate is viewed from the direction perpendicular to the light exit face, the directivity converting pattern located in the region which the light that has entered the light guide plate from the light entering face reaches is formed in an arc-like shape, and a center of an inscribed circle of the directivity converting pattern formed in an arc-like shape coincides with the light source center of the point light source. According to one or more embodiments, for almost all of the unit patterns existing in a region which the light that has entered the light guide plate from the light entering face reaches, expansions of light incident on the unit pattern from the point light source become approximately equal on both sides of the longitudinal axis of the unit pattern, and therefore the light-use efficiency is further improved as compared with that in the surface light source device disclosed in the patent document 4. Therefore, if the light introducing portion has the same efficiency, the dead space due to the light introducing portion can be reduced, and accordingly a ratio of a light-emitting area can be increased. Further, light leakage from the light introducing portion can be reduced so that the light introducing portion or a potion in the vicinity thereof is prevented from shining.

In one or more embodiments of the surface light source device according to the present invention, when the light guide plate is viewed from the direction perpendicular to the light exit face, the longitudinal axes of the respective unit patterns located in the region which the light that has entered the light guide plate from the light entering face reaches pass through a point on the centerline behind the light source center of the point light source. According to one or more embodiments, for almost all of the unit patterns existing in a region which the light that has entered the light guide plate from the light entering face reaches, expansions of light incident on the unit pattern from the point light source become approximately equal on both sides of the longitudinal axis of the unit pattern, and therefore the light-use efficiency is further improved as compared with that in the surface light source device disclosed in the patent document 4. Therefore, if the light introducing portion has the same efficiency, the dead space due to the light introducing portion can be reduced, and accordingly a ratio of a light-emitting area can be increased. Further, light leakage from the light introducing portion can be reduced so that the light introducing portion or a potion in the vicinity thereof is prevented from shining.

In one or more embodiments of the surface light source device according to the present invention, when the light guide plate is viewed from the direction perpendicular to the light exit face, the directivity converting pattern located in the region which the light that has entered the light guide plate from the light entering face reaches is formed in an arc-like shape, and the directivity converting pattern is formed such that an inscribed circle of the directivity converting pattern passes through both ends of a light exit window of the point light source, and the unit patterns located in the region which the light that has entered the light guide plate reaches are disposed such that the respective longitudinal axes thereof pass through a point of intersection between the centerline of the point light source and the inscribed circle. According to one or more embodiments, for all of the unit patterns existing in a region which the light that has entered the light guide plate from the light entering face reaches, expansions of light incident on the unit pattern from the point light source become approximately equal on both sides of the longitudinal axis of the unit pattern, and therefore the light-use efficiency is further improved as compared with that in the surface light source device disclosed in the patent document 4. Therefore, if the light introducing portion has the same efficiency, the dead space due to the light introducing portion can be reduced, and accordingly a ratio of a light-emitting area can be increased. Further, light leakage from the light introducing portion can be reduced so that the light introducing portion or a potion in the vicinity thereof is prevented from shining.

Note that one or more embodiments of the present invention has a feature obtained by combining the components described above optionally, and therefore numerous variations of the present invention are made possible by combining such components.

DETAILED DESCRIPTION

One or more embodiments of the present invention are described with reference to the attached drawings. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

First Embodiment

Figure 5:
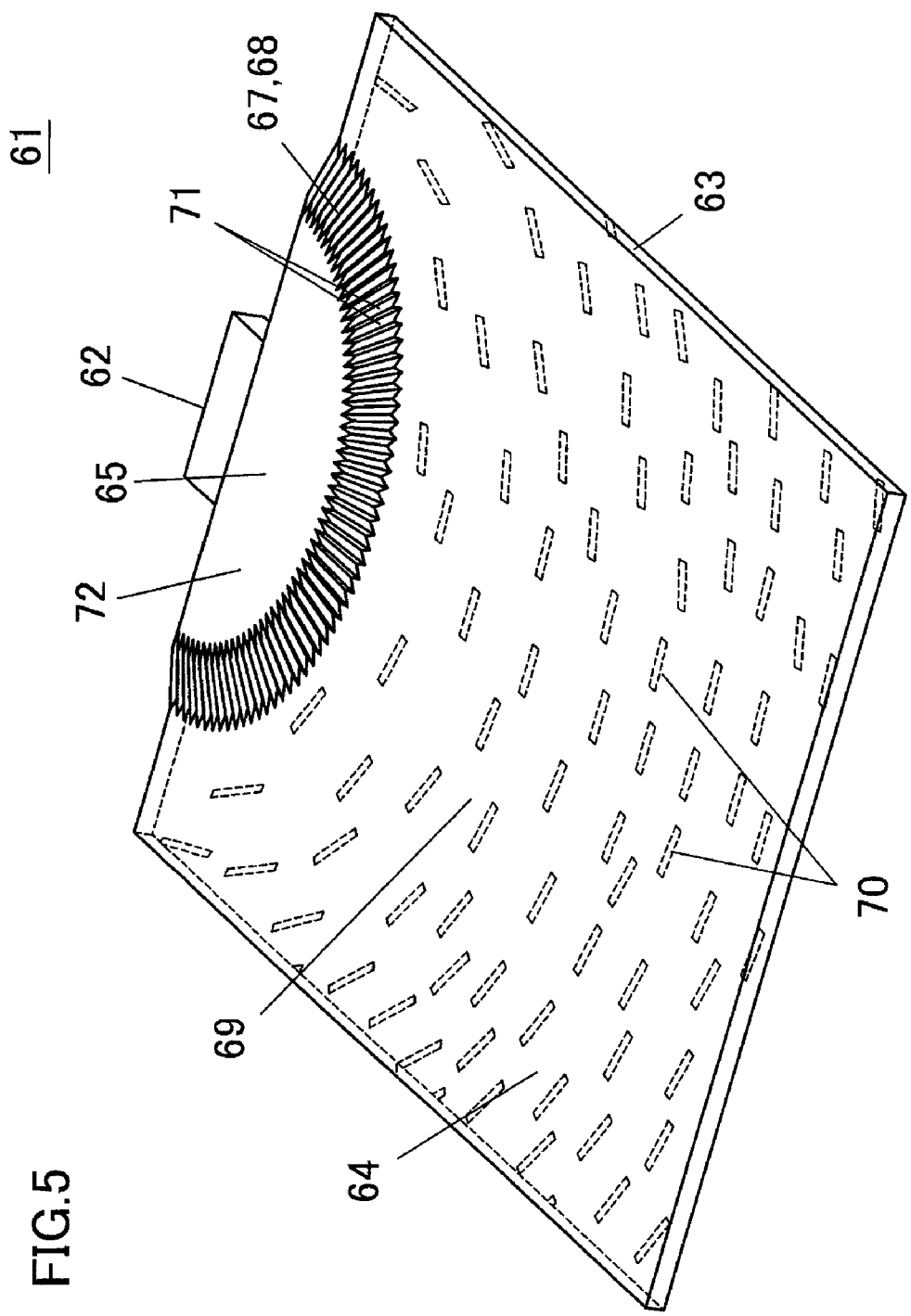
FIG. 5 is a perspective view showing a surface light source device according to a first embodiment of the present invention.
Figure 6:
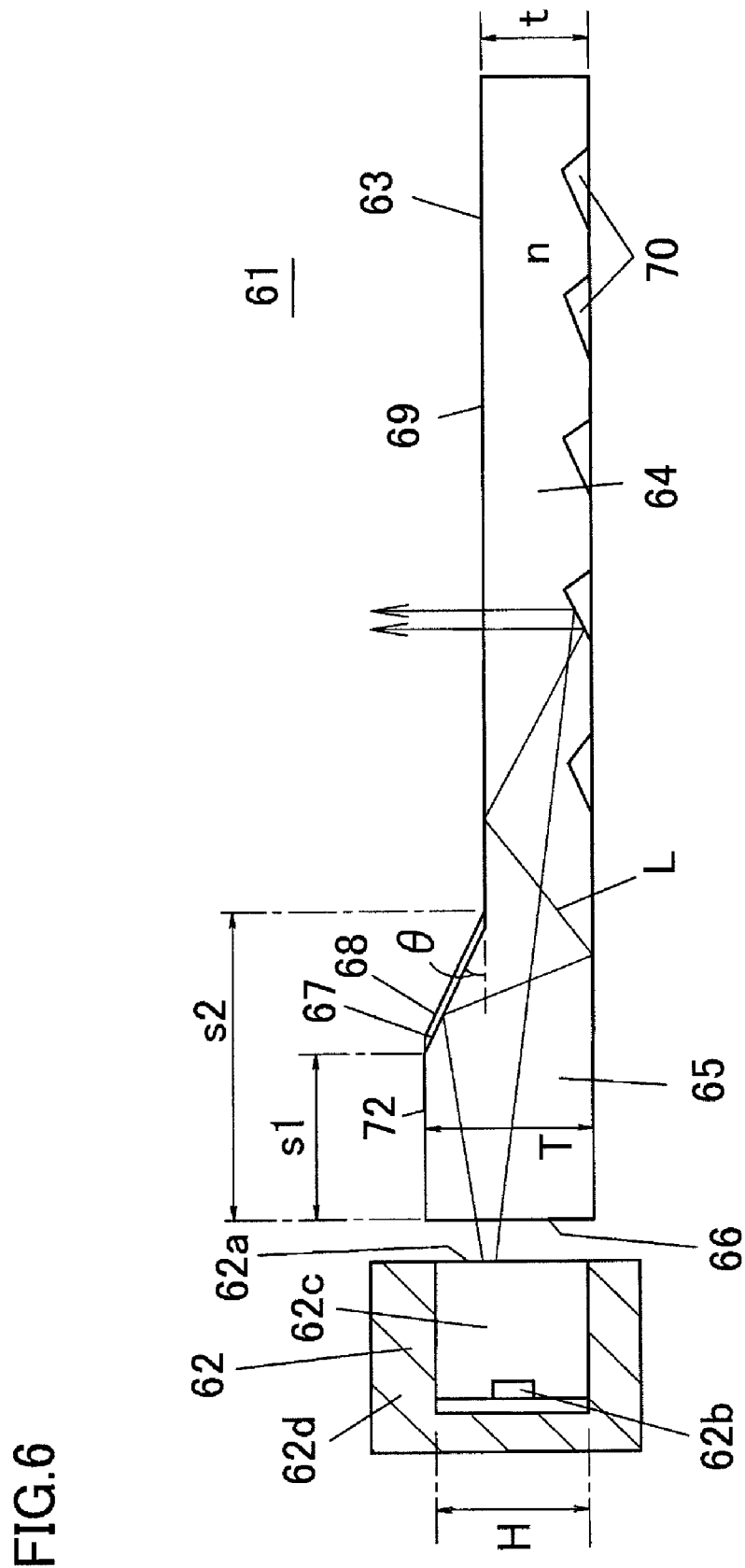
FIG. 6 is a schematic sectional view showing the surface light source device according to the first embodiment of the present invention.

A surface light source device according to a first embodiment of the present invention will be described. FIG. 5 is a perspective view showing a surface light source device 61 according to the first embodiment of the present invention, and FIG. 6 is a schematic section view thereof. The surface light source device 61 includes a point light source 62 and a light guide plate 63. The point light source 62 incorporates one or a plurality of LEDs 62b and emits white light. The LED 62b is sealed in a transparent sealing resin 62c, further the transparent sealing resin 62c, except for a front face thereof, is covered with a white resin 62d, and the front face of the transparent sealing resin 62c, which is exposed on the outside of the white resin 62d, serves as a light exit window 62a. This point light source 62 is small as compared with the width of the light guide plate 63 (a dimension in a depthwise direction in a plane of paper of FIG. 6), and called a point light source as contrasted with a cold-cathode fluorescent tube called a linear light source.

Note that the point light source is not a point light source in a strict sense. The point light source has a finite width, but is not like a cold cathode fluorescent tube, where a whole light-emitting surface emits light. For example, as the point light source, a side view-type LED may be used. At least one LED chip is contained in one package, and a plurality of LED chips may be sealed simultaneously. As a light source containing a plurality of chips simultaneously, there is also one having a size of an opening of approximately 5 mm in a widthwise direction, which is sufficiently small as compared with about 2 inches which is a light exit face size of the light guide plate, and therefore such a light source can be considered to be the point light source. Further, as another example, a light source where a size of an LED package itself is large but a plurality of LED chips is arranged locally and discretely in one package (for example, a case where the width of a light exit face of one package of an LED is approximately 40 mm, and LED chips are arranged discretely at intervals of 5 mm in the package) is also considered to be the point light source. Furthermore, the point light source may be a light source that emits parallel light, such as a semiconductor laser device. Moreover, light guided by using an optical fiber may be introduced into the light guide plate. In this case, a light exit end face of the optical fiber can be considered to be the point light source.

The light guide plate 63 is composed of a light guide plate body 64 and a light introducing portion 65 provided at an end of the body 64, and is formed of transparent resin with a high refractive index, such as acrylic resin, polycarbonate resin (PC), a cycloolefin material, or polymethylmethacrylate (PMMA). Hereinafter, the light guide plate 63 is regarded as being made of polycarbonate resin.

The light introducing portion 65 is a thick portion in the light guide plate 63, and an end face thereof serves as a light entering end face 66 and the point light source 62 is disposed so as to face the light entering end face 66. Further, a thickness T of the light entering end face 66 of the light introducing portion 65 is equal to a height H of the light exit window 62a, or thicker than that (T≧H). Therefore, light emitted from the point light source 62 enters the light introducing portion 65 through the light entering end face 66 efficiently, so that a light-use efficiency of the surface light source device 61 becomes high.

In the light introducing portion 65, on a face on the same side as the light exit face 69 of the light guide plate body 64, a projecting portion having the shape of approximately a half of a circular truncated cone projects to increase the thickness of the light introducing portion 65. A curved peripheral face of the projecting portion serves as an inclined face 67, and a directivity converting pattern 68 is formed on this inclined face 67. The inclined face 67 has a constant inclination angle θ over the whole circumference of the projecting portion of the light introducing portion 65. An upper face 72 of the light introducing portion 65 positioned on an inner peripheral side of the inclined face 67 forms a horizontal plane, that is, a plane parallel to the light exit face 69. Incidentally, the inclination angle θ of the inclined face 67 on which the directivity converting pattern 68 is formed can be redefined as an inclination angle of an envelope face of the directivity converting pattern 68. The directivity converting pattern 68 is an arc-shaped band-like region, as viewed from a direction perpendicular to the light exit face 69, where V-shaped groove structures 71 (or ridge structures with a inverted V-shape in section), each of which forms a V-shaped groove as a unit pattern, are radially arranged.

The light guide plate body 64 occupies a major area of the light guide plate 63, and a thickness t thereof is thinner than the thickness T of the light introducing portion 65 (t<T), so that thinning of the light guide plate 63 is achieved. A back face positioned opposite to the light exit face 69 of the light guide plate body 64 has a light emitting means 70. A pattern of concentrically-arranged triangular grooves is shown as the light emitting means 70 in FIGS. 5 and 6. The light emitting means 70 may be a pattern obtained by sandblasting, photographic printing of diffusion ink, a diffraction grating pattern, or any patterns of recesses or projections, or it may be obtained by inclining the face of the light guide plate body 64 opposite to the light exit face 69 (wedge-like light guide plate body). Further, the light emitting means 70 is also allowed to be provided on the light exit face 69, or both the light exit face 69 and the face opposite thereto. The light emitting means 70 has lower distribution density in the vicinity of the point light source 62, and the distribution density increases gradually as the distance from the point light source 62 increases.

Thus, in this surface light source device 61, as shown in FIG. 6, light L emitted from the point light source 62 enters the light introducing portion 65 from the light entering end face 66. A surface of the light introducing portion 65 which is thick and a surface of the light guide plate body 64 which is thin are connected via the inclined face 67. Therefore the light of the point light source 62 that has entered the light introducing portion 65 is guided into the light guide plate body 64 while being totally reflected between the inclined face 67 and a face opposite thereto, or the light passes through the light introducing portion 65 to be guided into the thin light guide plate body 64. At that time, the light incident on the inclined face 67 is reflected by the directivity converting pattern 68 so that light leakage from the inclined face 67 becomes small, and therefore the light is efficiently guided into the light guide plate body 64. The light L that has been guided in the light guide plate body 64 is totally reflected or diffused by the light exit means 70 and emitted approximately uniformly from the whole of the light exit face 69.

Next, a structure of the directivity converting pattern 68 in the first embodiment will be described in detail. Longitudinal axes of the respective V-shaped groove structures 71 arranged along the inclined face 67 of the light introducing portion 65 (straight lines extended in a longitudinal direction of valley lines or ridge lines of the V-shaped groove structures 71) intersect at a point F at a position higher than the upper face 72 of the light introducing portion 65.

Figure 7:
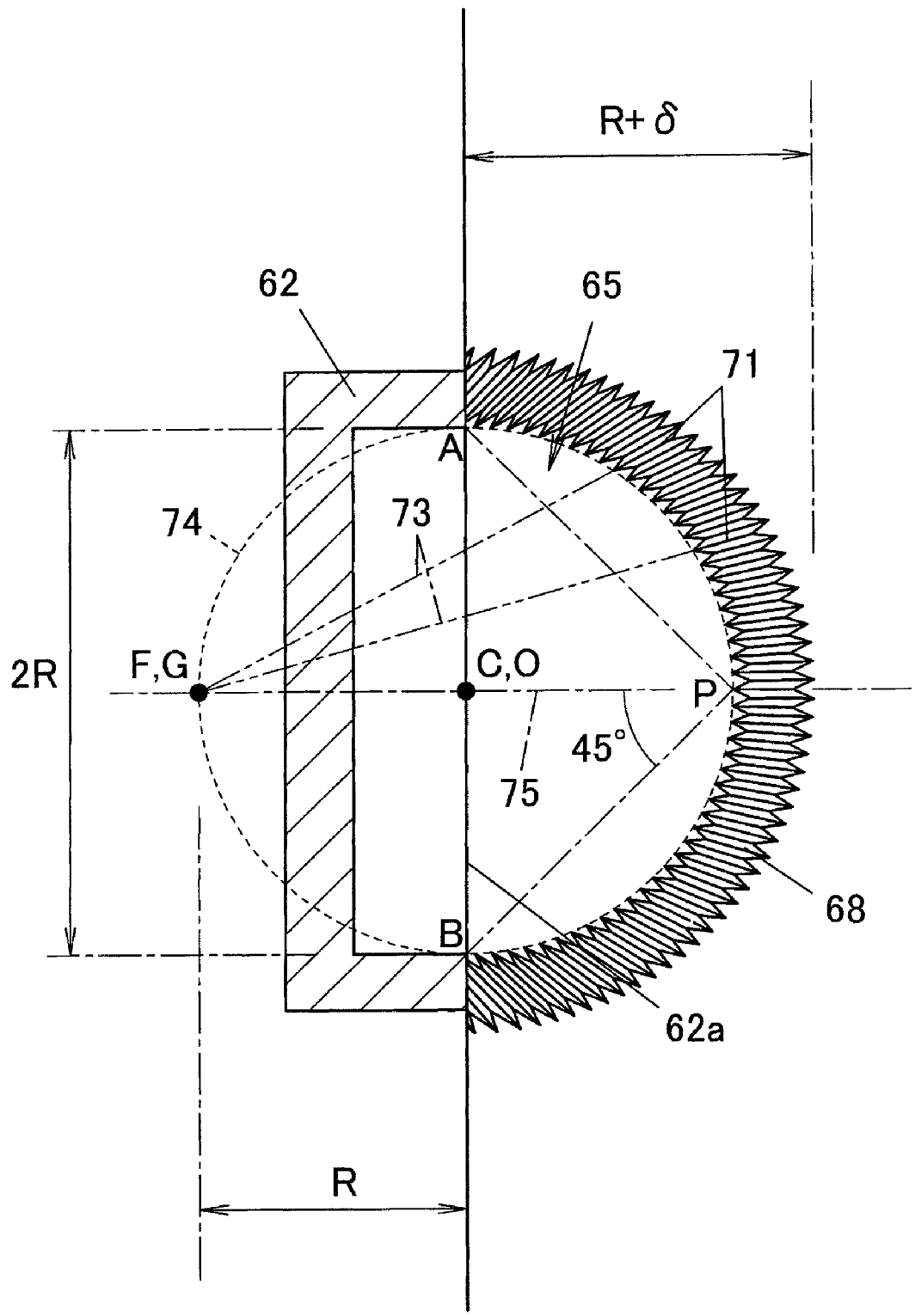
FIG. 7 is a plan view of the light introducing portion in the surface light source device according to the first embodiment of the present invention, as viewed from a direction perpendicular to a light exit face.

FIG. 7 is a plan view of the light introducing portion 65 as viewed from the direction perpendicular to the light exit face 69. When viewed from the direction perpendicular to the light exit face 69, a circle 74 inscribed in the directivity converting pattern 68 passes through both ends A and B of the light exit window 62a of the point light source 62. Further, the point F on which the longitudinal axes 73 of the V-shaped groove structures 71 converge coincides with a point of intersection G between the inscribed circle 74 and a centerline 75 of the point light source 62 (a straight line passing through a center C of the light exit window 62a and being perpendicular to a direction connecting both the ends A and B).

Figure 8:
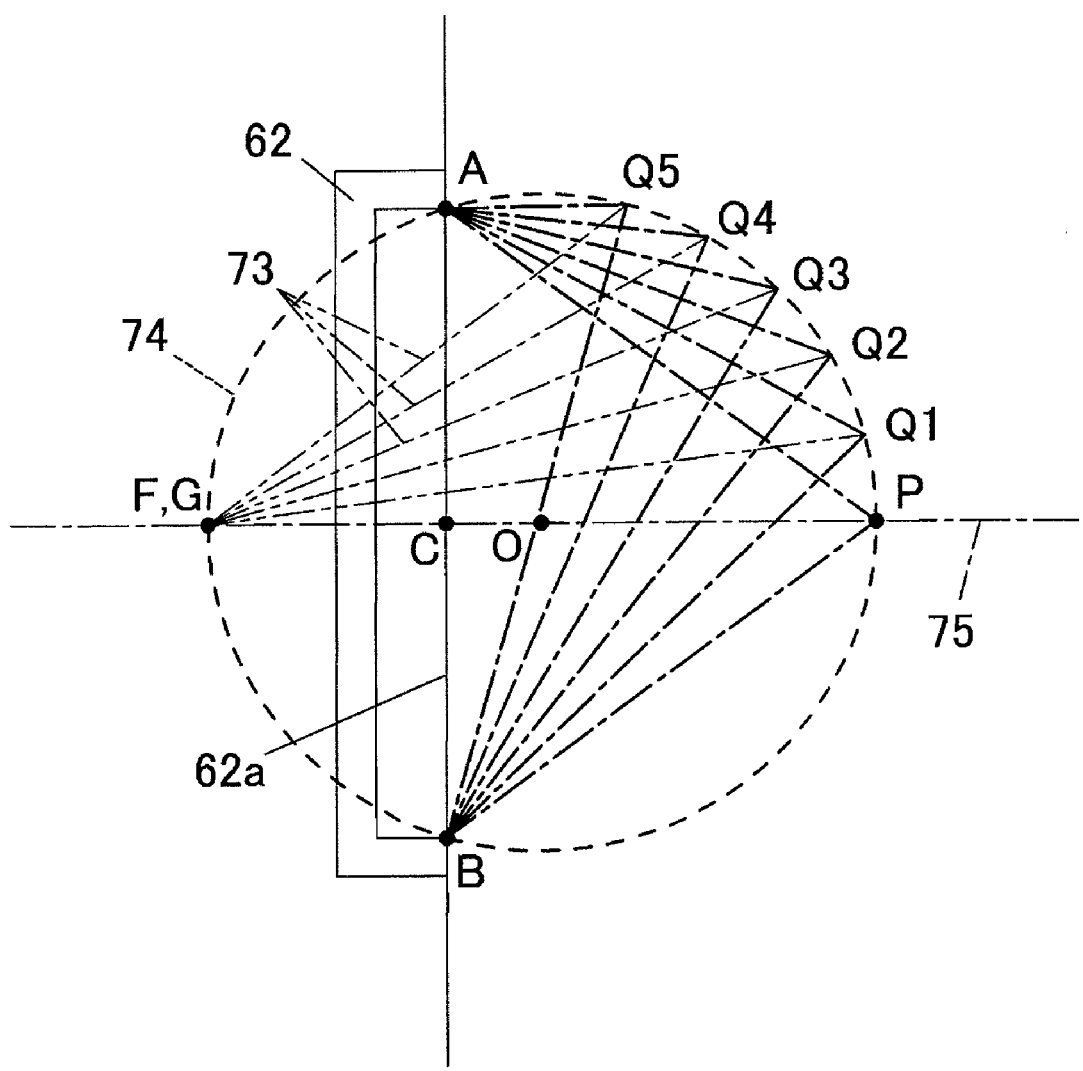
FIG. 8 is a schematic view for explaining a function of the light introducing portion shown in FIG. 7 according to one or more embodiments of the present invention.

FIG. 8 is a schematic view for explaining a function of the light introducing portion 65 having such a structure as shown in FIG. 7. As described above, when both the ends A and B of the light exit window 62a are positioned at any points on the inscribed circle 74, and the longitudinal axes 73 of all of the V-shaped groove structures 71 pass through the point of intersection G(=F) between the inscribed circle 74 and the centerline 75, their positional relationship is as shown in FIG. 8. Here, when ends on an inner-peripheral side of the respective V-shaped groove structures 71 are denoted by P, Q1, Q2, Q3, . . . , straight lines PF, Q1F, Q2F, Q3F, . . . are the longitudinal axes 73 of the respective V-shaped groove structures 71. Note that P, Q1, Q2, Q3, . . . are points on the inscribed circle 74 positioned ahead of the point light source 62, P is a point on the centerline 75, and Q1, Q2, Q3, . . . are any points on the inscribed circle 74. Incidentally, a point O is the center of the inscribed circle 74.

As can be seen from FIG. 8, all angles ∠APF, ∠AQ1F, ∠AQ2F, ∠AQ3F, . . . are angles of circumference of an identical arc AG, and therefore these angles are equal to each other. That is, ∠APF=∠AQ1F=∠AQ2F=∠AQ3F= (Equation 1)

Similarly, all angles ∠BPF, ∠BQ1F, ∠BQ2F, ∠BQ3F, . . . are angles of circumference of an identical arc BG, and therefore these angles are also equal to each other. That is, ∠BPF=∠BQ1F=∠BQ2F=∠BQ3F= (Equation 2)

Further, because the point P is a point on the centerline 75, the following equation is obtained.

∠APF=∠BPF (Equation 3)

Therefore, according to the equations 1 to 3, the following result can be obtained:

∠AQ1F=∠SQ1F

∠AQ2F=∠BQ2F

∠AQ3F=∠BQ3F (Equation 4)

The above equation 4 means that, in any of the V-shaped groove structures 71, expansions of light incident on the V-shaped groove structure 71 from the point light source 62 are equal on right and left sides of the longitudinal axis 73 of the V-shaped groove structure 71. That is, a rightward expansion ∠AQmF and a leftward expansion ∠BQmF regarding a longitudinal axis QmF of an expansion ∠AQmB of light incident on the V-shaped groove structure 71 positioned at a point Qm (m=1, 2, . . . ) are equal.

Figure 9:
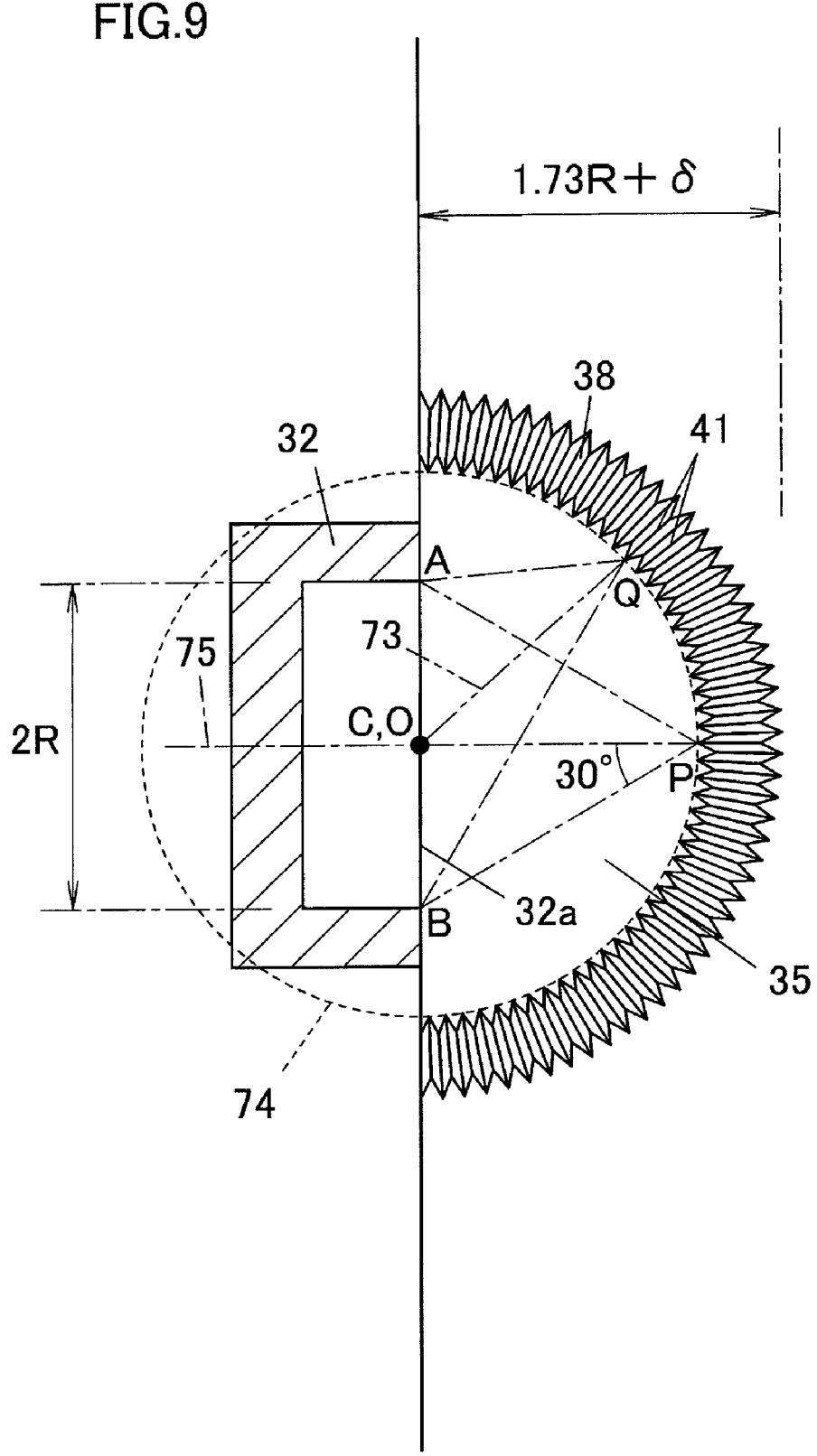
FIG. 9 is a plan view showing a structure of the light introducing portion in a comparative example (one described in the patent document 4).

FIG. 9 is a view showing a structure of the light introducing portion 35 in a comparative example (one described in the patent document 4), and is a plane view thereof as viewed from the direction perpendicular to the light exit face. In this comparative example, the center O of the inscribed circle 74 of the directivity converting pattern 38 coincides with the center C (light source center) of the light exit window 32a, the longitudinal axes 73 of the respective V-shaped groove structures 41 pass through the center O of the inscribed circle 74. In such a comparative example, an rightward incident light expansion ∠APO and a leftward incident light expansion ∠BPO from the longitudinal axis 73 are equal to each other regarding the V-shaped groove structure 41 positioned at the point P on the centerline 75. But an rightward incident light expansion ∠AQO and a leftward incident light expansion ∠BQO from the longitudinal axis 73 are different from each other regarding the V-shaped groove structure 41 positioned at any point Q deviating from the centerline 75. Therefore, in such a light introducing portion 35 as in the comparative example, light is incident on a large majority of the V-shaped groove structures 41 from a biased direction, and accordingly light leakage from the light introducing portion 35 becomes large.

On the other hand, in the light introducing portion 65 shown in FIG. 7, because the rightward incident light expansion and the leftward incident light expansion from the longitudinal axis 73 of the V-shaped groove structure 71 are equal to each other regardless of the position of the V-shaped groove structure 71, light leakage in the light introducing portion 65 becomes small, so that the light-use efficiency of the surface light source device 61 is improved.

Figure 10:
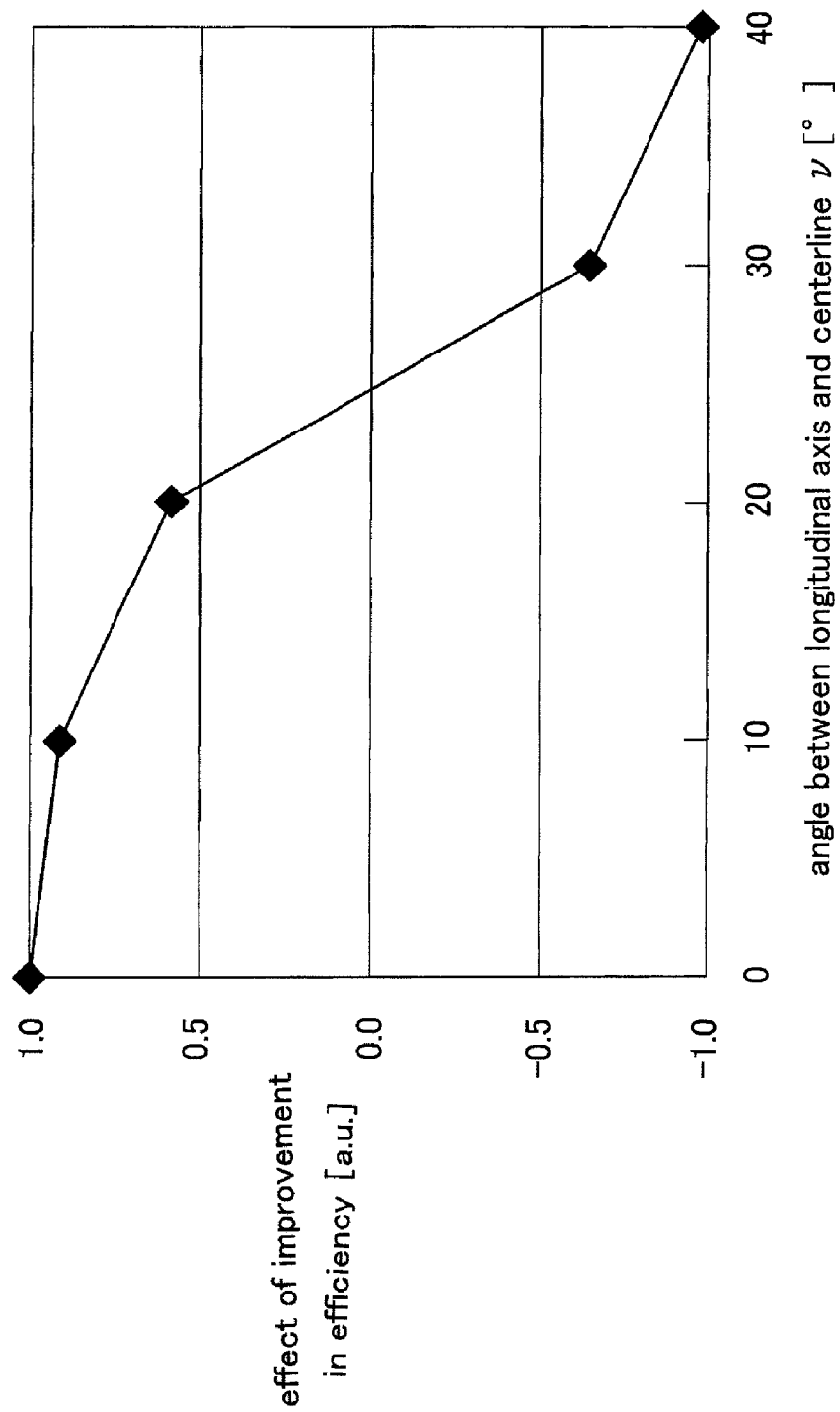
FIG. 10 is a graph showing a simulation-based verification result of an effect of a difference between light incident from right on a V-shaped groove structure and light incident from left thereon on the efficiency of the surface light source device according to one or more embodiments of the present invention.
Figure 11:
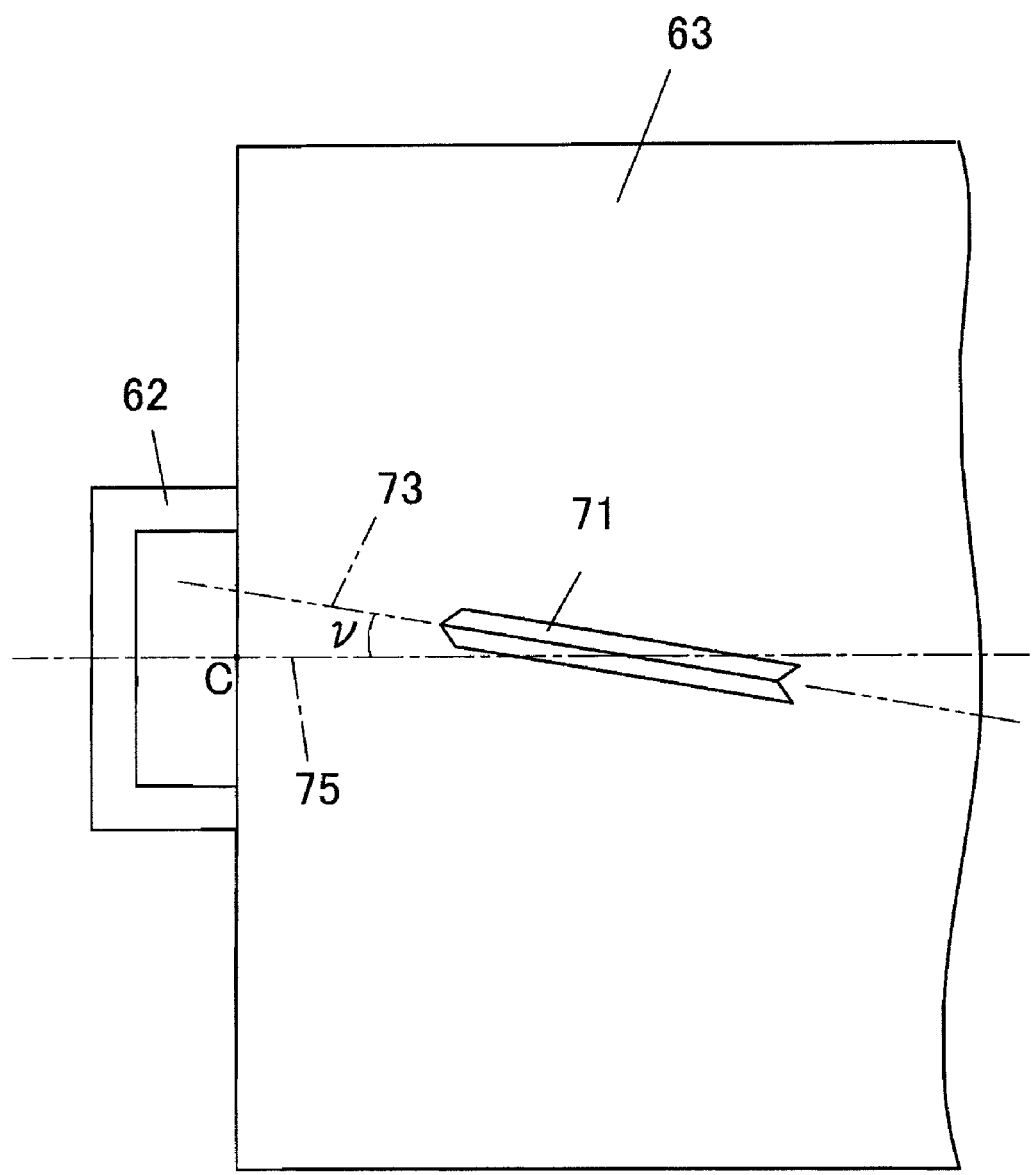
FIG. 11 is a diagram for explaining a model to obtain data shown in FIG. 10 according to one or more embodiments of the present invention.

FIG. 10 is a graph showing a simulation-based verification result of an effect on the efficiency of the surface light source device 61 by an imbalance of light incident on the V-shaped groove structure 71, that is, a difference between light incident from right on a V-shaped groove structure and light incident from left thereon. Further, FIG. 11 is a diagram describing a model to obtain data of FIG. 10. In this simulation experiment (the simulation has been performed under the same conditions as described in paragraph 0167 in the patent document 4), as shown in FIG. 11, the V-shaped groove structure 71 has been formed on the centerline 75 of the point light source 62 on an upper face of the light guide plate 63 for a test, an angle ν between the longitudinal axis 73 of the V-shaped groove structure 71 and the centerline 75 has been changed, and an effect of improvement in efficiency has been calculated. The effect of improvement in efficiency means an efficiency showing how much light is transmitted from the light introducing portion 65 to the light guide plate body 64 without being leaked, where an efficiency when there is no V-shaped groove structure 71 provided is set at zero, and a case where the effect of improvement in efficiency of light leakage prevention (light leakage is reduced) is observed is positive, while a case where, in contrast, the efficiency of light leakage prevention is reduced (light leakage increases) is negative. Specifically, when the angle of the longitudinal axis 73 of the V-shaped groove structure 71 to the centerline 75 is denoted by ν, a quantity of light transmitted to the light guide plate body 64 is defined as Iν and a quantity of light transmitted to the light guide plate body 64 with no pattern is defined as Io, then the effect of improvement in efficiency is represented as (Iν-Io)/Io. Further, in the effect of improvement in efficiency shown in FIG. 10, the highest effect of improvement in efficiency is normalized as 1.

As understood from FIG. 10, the effect of improvement in efficiency of the surface light source device 61 decreases with increase in the angle ν of the longitudinal axis 73. Therefore, it can be confirmed that the V-shaped groove structure 71 has the highest efficiency when the incident light expansion on the right side of the longitudinal axis 73 and the incident light expansion on the left side thereof become equal to each other. That is, the efficiency of the surface light source device 61 is improved by arranging the V-shaped groove structures 71 such that the longitudinal axes 73 of the respective V-shaped groove structures 71 converge on the point G on the inscribed circle 74, as shown in FIG. 7, rather than by arranging the V-shaped groove structures 41 such that the longitudinal axes 73 of the respective V-shaped groove structures 41 converge on the light source center C, as shown in FIG. 9. Therefore, according to such a structure as the present embodiment, because the leakage light in the light introducing portion 65 can be reduced and the efficiency of the surface light source device 61 can be improved, so that it becomes possible to reduce the dead space.

Specific explanation is as follows. In the light introducing portion 35 in FIG. 7, the center C of the inscribed circle 74 coincides with the light source center C, the one-sided angles of view ∠APC=∠BPC=45° is satisfied, and a distance between the point of convergence F of the longitudinal axes 73 and the light source center C is R. In this case, a width of the light exit window 62a is 2 R, and a length of the V-shaped groove structure 71 is δ, then a dead space due to the light introducing portion 65 becomes R+δ, and the percentage of maximum leakage light is approximately 4.0%. On the other hand, in the comparative example in FIG. 9, when the one-sided angle of view ∠APC=∠BPC=30° is satisfied, the dead space becomes (√3)R+δ≈1.73 R+δ, and the percentage of maximum leakage light is 15% as mentioned above. Therefore, according to the light introducing portion 35 of the first embodiment shown in FIG. 7, compared with the comparative example in FIG. 9, the percentage of maximum leakage light can be made lower than that in the comparative example, and besides, the dead space can also be made smaller than that in the comparative example.

Further, in the surface light source device 61 of the present embodiment, it is not always necessary for the center O of the inscribed circle 74 to coincide with the light source center C. Therefore, by displacing the center C of the inscribed circle 74 along the centerline 75, as shown in FIG. 8, the one-sided angle of view ∠APC=∠BPC can be changed.

Figure 1:
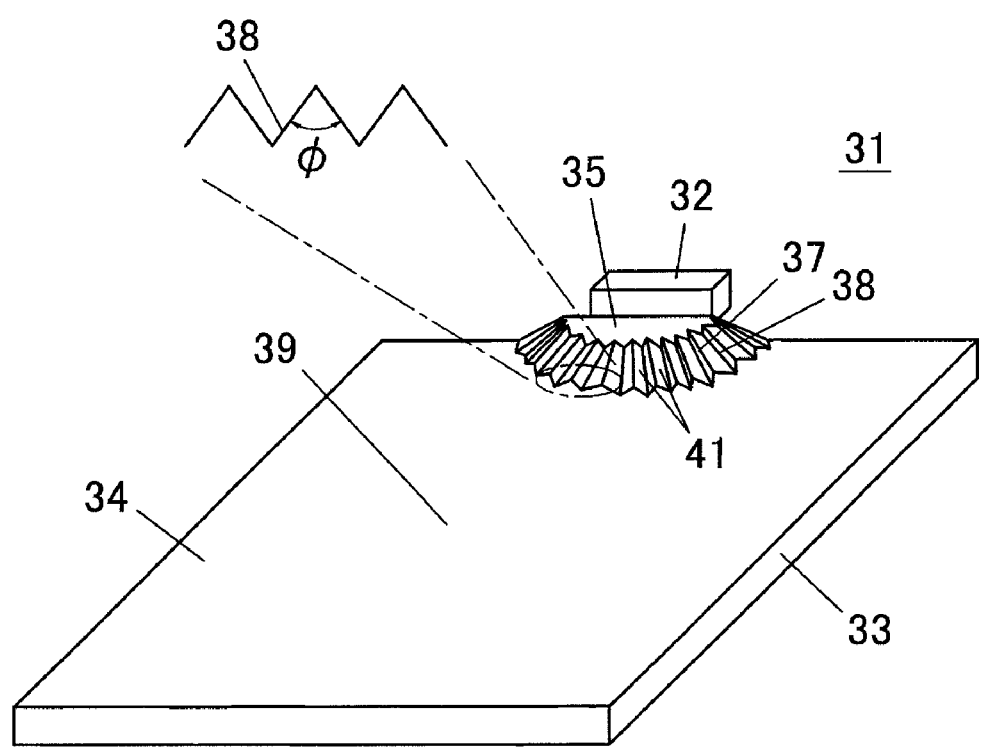
FIG. 1 is a perspective view showing a surface light source device disclosed in the patent document 4.
Figure 2:
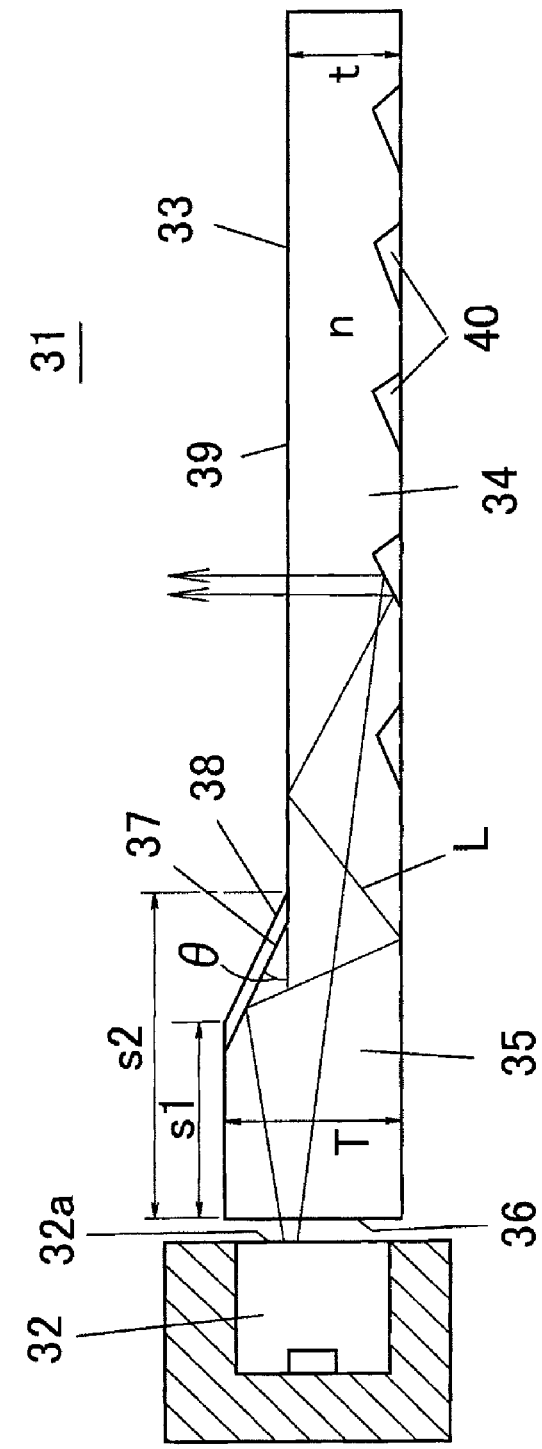
FIG. 2 is a diagram showing light behavior in the surface light source device shown in FIG. 1.
Figure 3A:
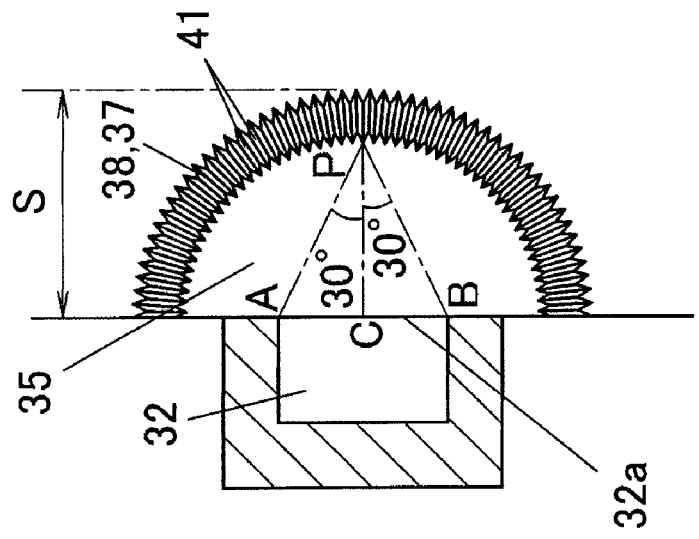
FIGS. 3A and 3B are diagrams showing a relationship between an angle of view from a center of an inner periphery of a directivity converting pattern to a light exit window of a point light source and a size of the directivity converting pattern.
Figure 3B:
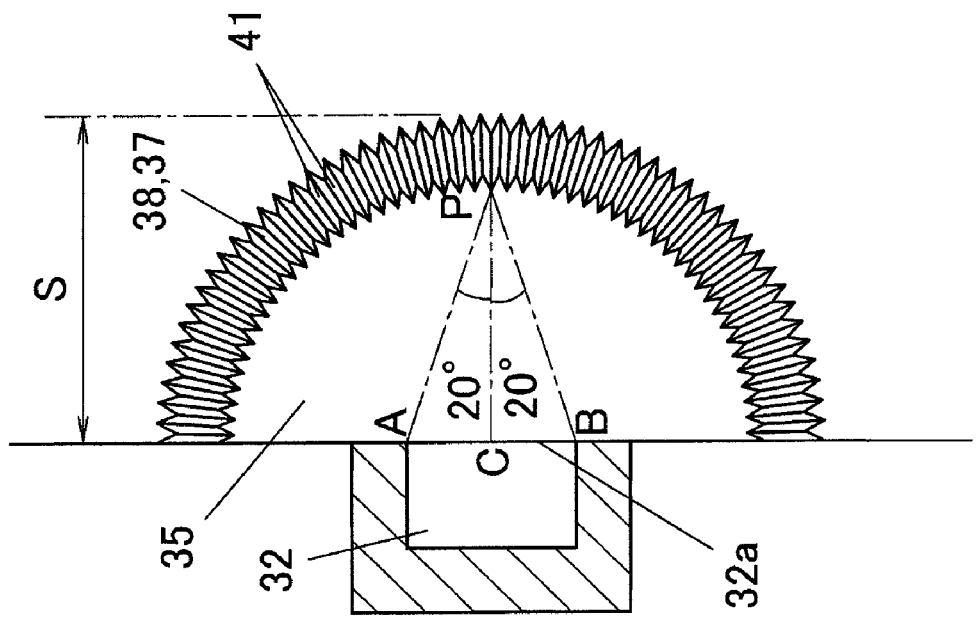
Figure 4:
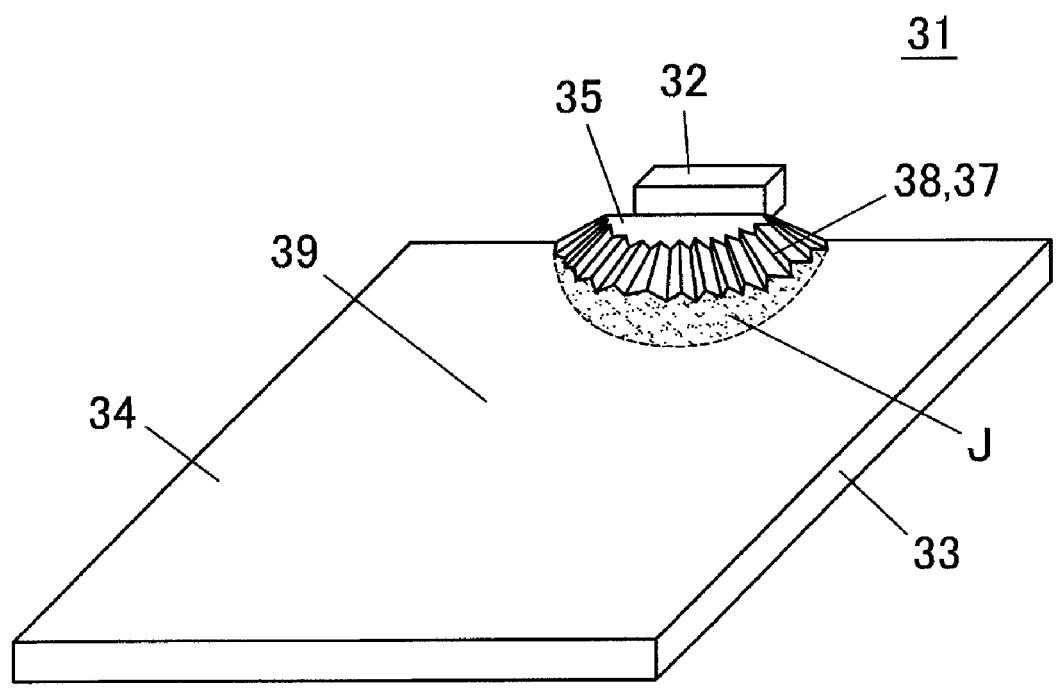
FIG. 4 is a schematic view showing an aspect where a light-emitting region with high luminance is created at an edge of a light introducing portion in the surface light source device shown in FIG. 1.
Figure 12:
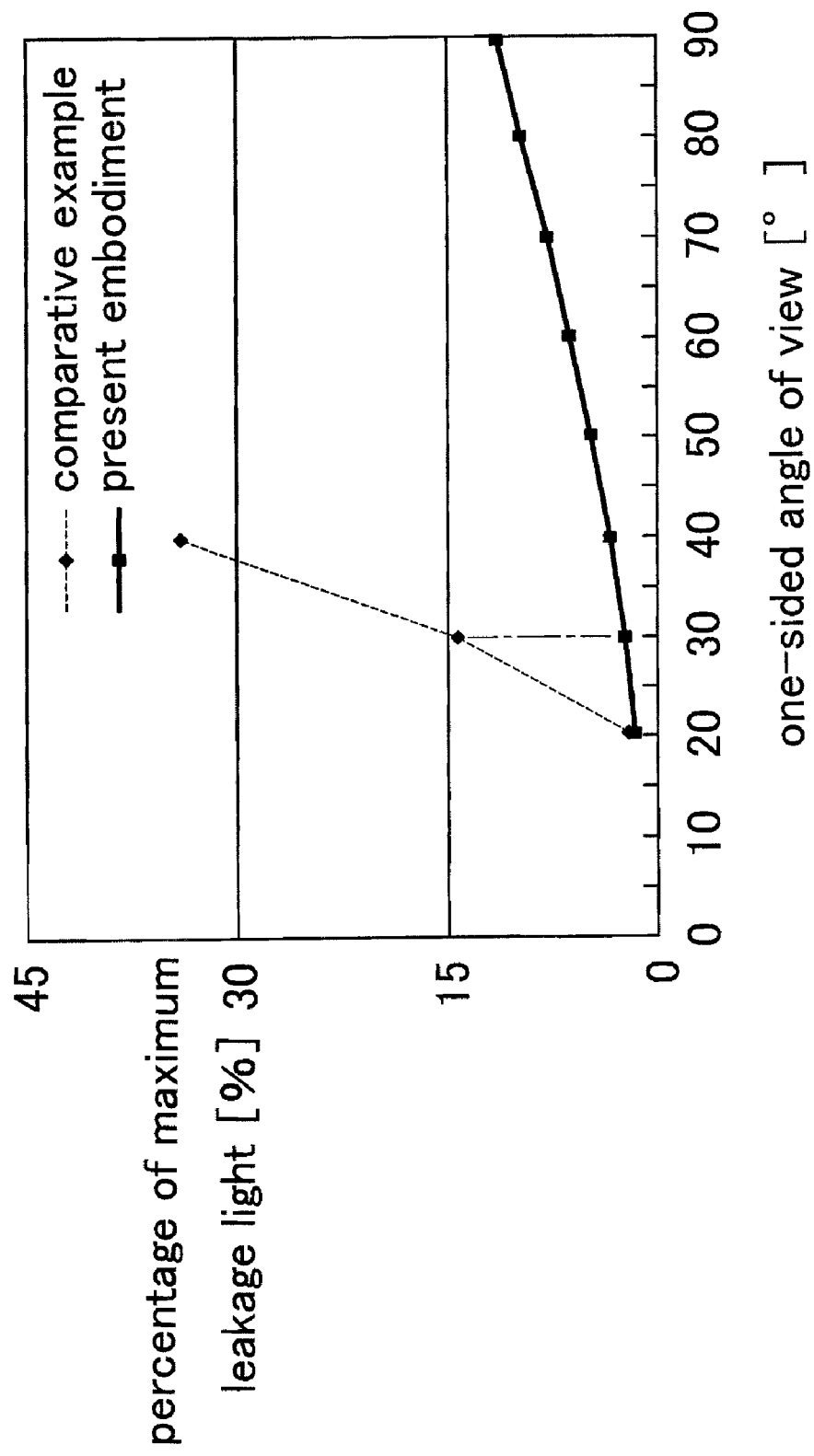
FIG. 12 is a graph showing a result of calculations of the percentages of maximum leakage light when the one-sided angles of view are changed in the surface light source device in the comparative example and the surface light source device according to one or more embodiments of the present embodiment.

FIG. 12 is a graph showing a result of calculations of the percentages of maximum leakage light when the one-sided angle of view is changed in the surface light source device in the comparative example and the surface light source device 61 in the present embodiment. Parameters used here are as follows (see FIGS. 2 and 6):

Refractive index of the light guide plate n=1.59
Vertex angle of the ridge portion of the directivity converting pattern φ=120°
Thickness of the end face of the light introducing portion T=0.31 mm
Thickness of the light guide plate body t=0.18 mm
Length of the upper face of the light introducing portion s1=2.50 mm
Length of the light introducing portion s2=3.19 mm
Inclination angle of the inclined face 37 θ=15.3°. According to FIG. 12, if the one-sided angles of view of the surface light source device in the comparative example and the surface light source device in the present embodiment are equal to each other, the percentage of maximum leakage light of the surface light source device 61 of the present embodiment is lower.

Once the leakage light of the surface light source device has reached approximately 15%, the light-use efficiency of the surface light source device decreases to cause reduction of luminance of the light emitting face, and the light leaked from the directivity converting pattern creates a light emitting region with high luminance at the edge of the light introducing portion, and therefore the percentage of maximum leakage light is practically limited to approximately 15%. Then, when the one-sided angle of view at which the percentage of maximum leakage light becomes 15% or less is confirmed in FIG. 12, it must be approximately 30° or less in the comparative example, but in the present embodiment, the percentage of maximum leakage light is much lower than 15% even when the one-sided angle of view is close to 90°. Alternatively, regardless of the one-sided angle of view, the percentage of maximum leakage light becomes 15% or less.

Further, in the case of the present embodiment, when the one-sided angle of view ∠APC=∠BPC=ω is defined, a distance D between the point of convergence F and the light source center C is expressed by $$D = R \times \tan \omega \quad \text{(Equation 5)},$$

where a width of the light exit window 62a is denoted by 2 R. A dead space is expressed by $$(R/\tan \omega) + \delta \quad \text{(Equation 6)},$$

where a length of the V-shaped groove structure 71 is denoted by δ.

Figure 13:
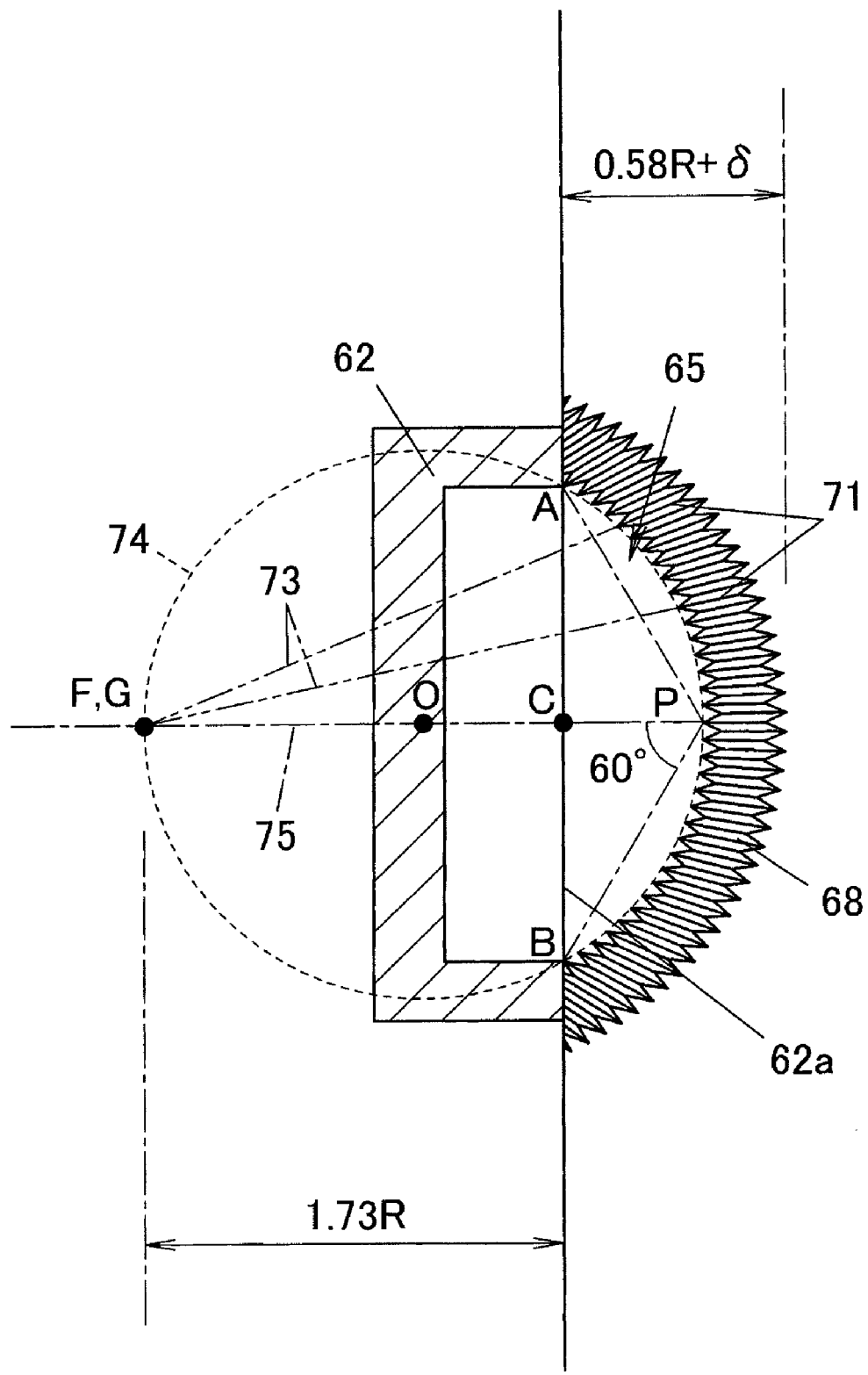
FIG. 13 is a plane view showing a case where the one-sided angle of view is set to 60° in the light introducing portion according to the first embodiment of the present invention.

For example, in the light introducing portion 35 of the present embodiment, a case where the one-sided angles of view is ∠APC=∠BPC=60° is shown in FIG. 13. In this case, according to FIG. 12, the percentage of maximum leakage light is approximately 6.5%, which is much lower than that in the comparative example in FIG. 9 where the one-sided angle of view is 30°. Further, in this case, according to the equation 6, the dead space becomes R/(√3)+δ≈0.58 R+δ, which is also much smaller than that in the comparative example in FIG. 9. Further, according to the equation 5, the distance between the point of convergence F and the light source center is (√3) R≈1.73 R.

Figure 14:
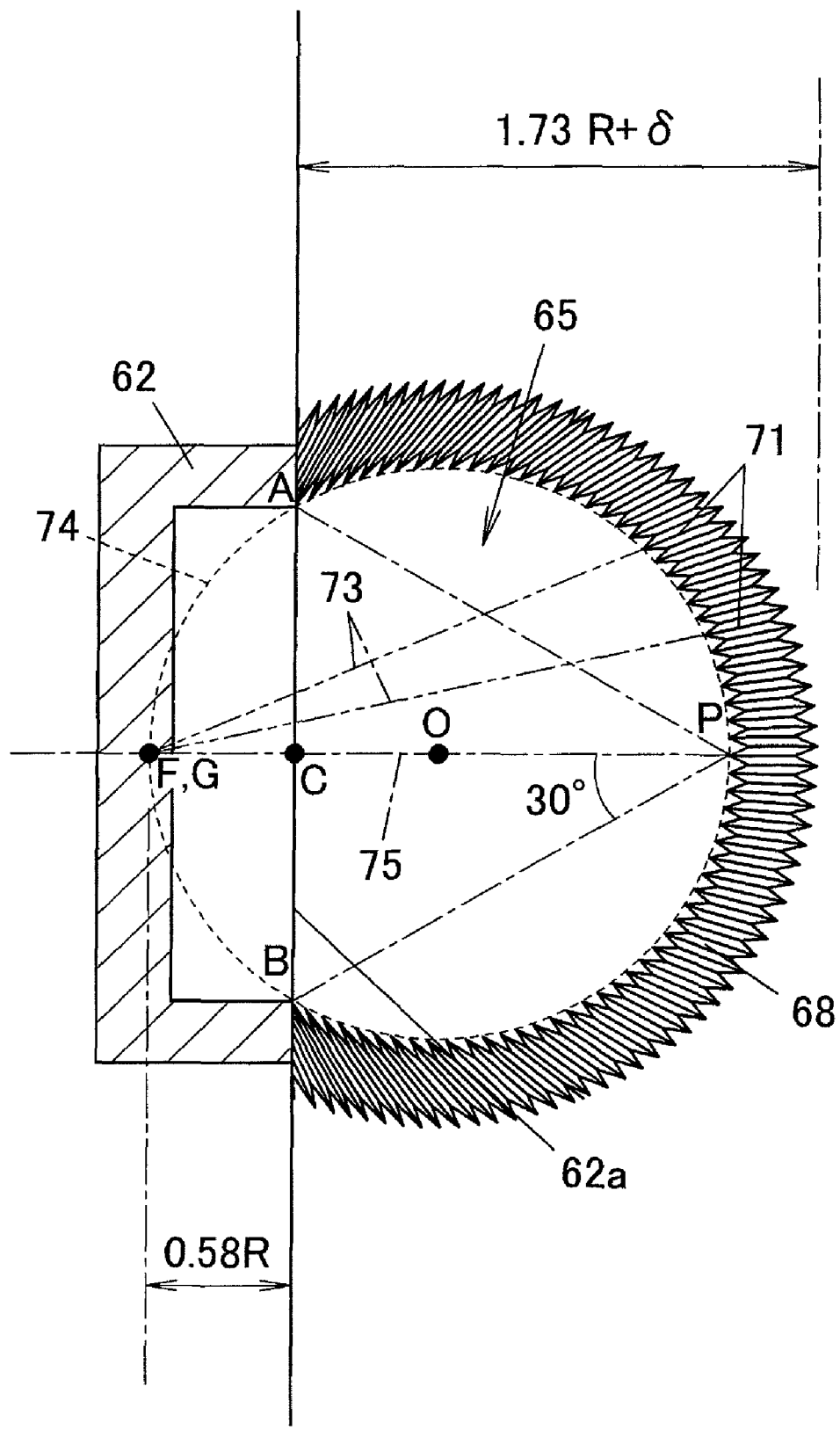
FIG. 14 is a plan view showing a case where the one-sided angle of view is set to 30° in the light introducing portion according to the first embodiment of the present invention.

Further, in the light introducing portion 35 of the present embodiment, a case where the one-sided angle of view is ∠APC=∠BPC=30° is shown in FIG. 14. This is a case where the one-sided angle of view is the same in magnitude as that in the comparative example in FIG. 9. In this case, the percentage of the maximum leakage light is further reduced to approximately 2.5% (according to FIG. 12). Further, the dead space becomes (√3)R+δ≈1.73 R+δ, which becomes equal to the dead space in the comparative example in FIG. 9. Further, the distance between the point of convergence F and the light source center C becomes R/(√3)≈0.58 R.

Therefore, according to the surface light source device of the present embodiment, because the leakage light can be reduced as compared with the surface light source device disclosed in the patent document 4, the light-use efficiency can be improved. That is, if the one-sided angles of view are equal to each other, as compared with the comparative example in FIG. 9, the leakage light is reduced while the same dead space is being maintained, and the light-use efficiency is improved accordingly. Further, if the percentages of maximum leakage light are equal to each other, the dead space becomes smaller than that in the comparative example in FIG. 9.

Figure 15:
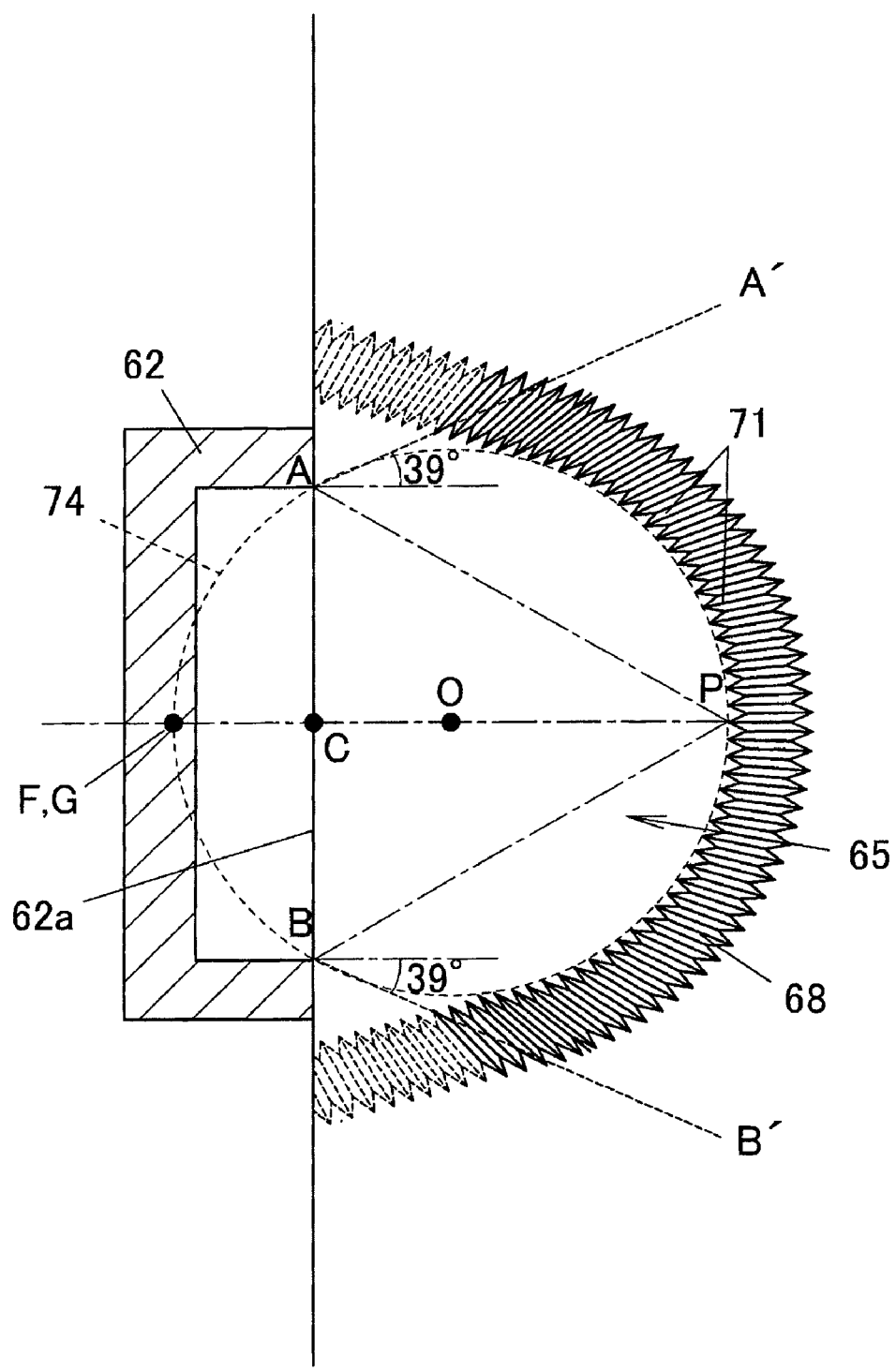
FIG. 15 is a plan view for explaining a case where the light introducing portion in FIG. 14 is deformed according to one or more embodiments of the present invention.

Note that, even if the expansion of light emitted from the point light source 62 is 180° as viewed in a plane, expansion of the light that has entered the light introducing portion 65 through the light entering end face 66 becomes narrower than 180° because of refraction. For example, if the refractive index of the light guide plate 63 is 1.59, the expansion of light in the light introducing portion 65 becomes 2×arcsin(1/1.59) ≈78°(=twice a critical angle of total reflection). In this case, the light does not reach a direction at an angle of 39° or more from the end A of the light exit window 62a shown in FIG. 15, that is, outside a straight line A-A'. Similarly, the light does not reach a direction at an angle of 39° or more from the end B of the light exit window 62a, that is, outside a straight line B-B'. Therefore, it is unnecessary to provide the V-shaped groove structure 71 in these regions which light does not reach, as shown in FIG. 15. Alternatively, as shown with broken lines in FIG. 15, these regions may be provided with a pattern having any shape. This holds true for any embodiment. In particular, in such a case as shown in FIG. 14 where a distance between end portions on the side of the point light source 62 in the directivity converting pattern 38 becomes narrower, the distance can be expanded as shown in FIG. 15.

Modifications of the First Embodiment

In the first embodiment, the light of the point light source 62 is made incident evenly on the respective V-shaped groove structures 71 by converging the longitudinal axes 73 of the respective V-shaped groove structures 71 on the point of intersection G between the inscribed circle 74 and the centerline 75. But, as can be seen from FIG. 10, the efficiency does not sharply decrease even if the directions of the longitudinal axes 73 of the V-shaped groove structures 71 are slightly different from one another. Further, because one or more embodiments of the present invention are aimed at improving the efficiency as compared with that in the surface light source device disclosed in the patent document 4, the conditions thereof can be eased within an allowable range. That is, all the V-shaped groove structures 71 do not strictly have to satisfy such conditions as described above.

Therefore, in the surface light source device according to a modification of the first embodiment, the structure of the light introducing portion 65 can be characterized as follows.

Figure 16:
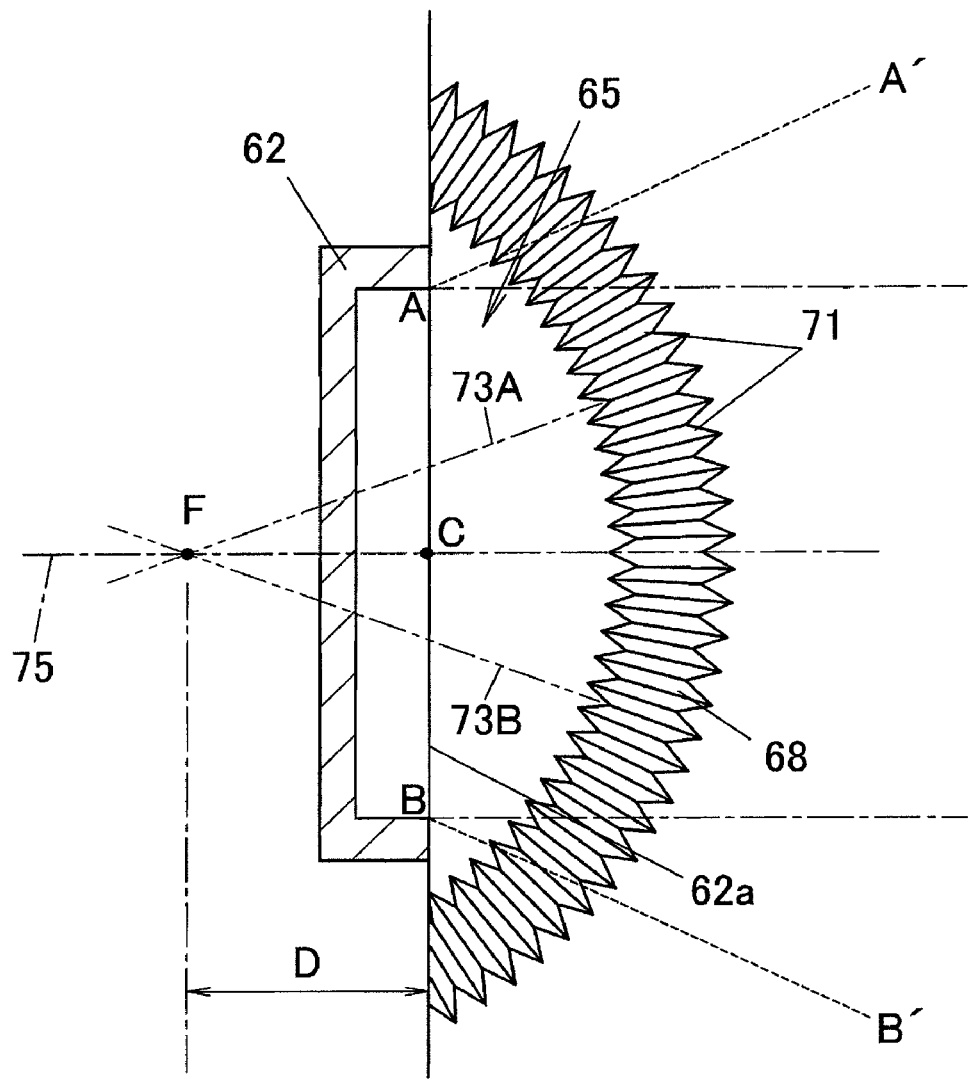
FIG. 16 is a plan view showing a first modification of the first embodiment according to one or more embodiments of the present invention.

FIG. 16 is a plan view showing a first modification of the first embodiment. In this modification, when the light guide plate 63 is viewed from the direction perpendicular to the light exit face 69, a first point of intersection at which a first straight line 73A intersects with the centerline 75 and a second point of intersection at which a second straight line 73B intersects with the centerline 75 coincide with each other at one point F on the centerline 75. The first straight line 73A is defined as a straight line obtained by averaging the longitudinal axis 73 of the respective V-shaped groove structures 71 which is positioned in a region where light which has entered the light introducing potion 65 from the light entering end face 66 reaches and on one side of the centerline 75 of the point light source 62 (that is, the V-shaped groove structures 71 existing between the centerline 75 and the straight line A-A' in FIG. 16). The second straight line 73B is defined as a straight line obtained by averaging the longitudinal axis 73 of the respective V-shaped groove structures 71 which is positioned in a region where light which has entered the light introducing potion 65 from the light entering end face 66 reaches and on the other side of the centerline 75 of the point light source 62 (that is, the V-shaped groove structures 71 existing between the centerline 75 and the straight line B-B' in FIG. 16). The point of intersection F is a point behind the light source center C, and a point which excludes the light source center C and the distance D of which from the light source center C is equal to or less than 12 R, which is six times the width of the light exit window 62a. Further, it is desired that the point of intersection F is in the vicinity of the point of intersection G between the inscribed circle 74 of the directivity converting pattern 68 and the centerline 75. Incidentally, the matter that the distance D from the light source center C is equal to or less than six times the width of the light exit window will be described later.

Figure 17:
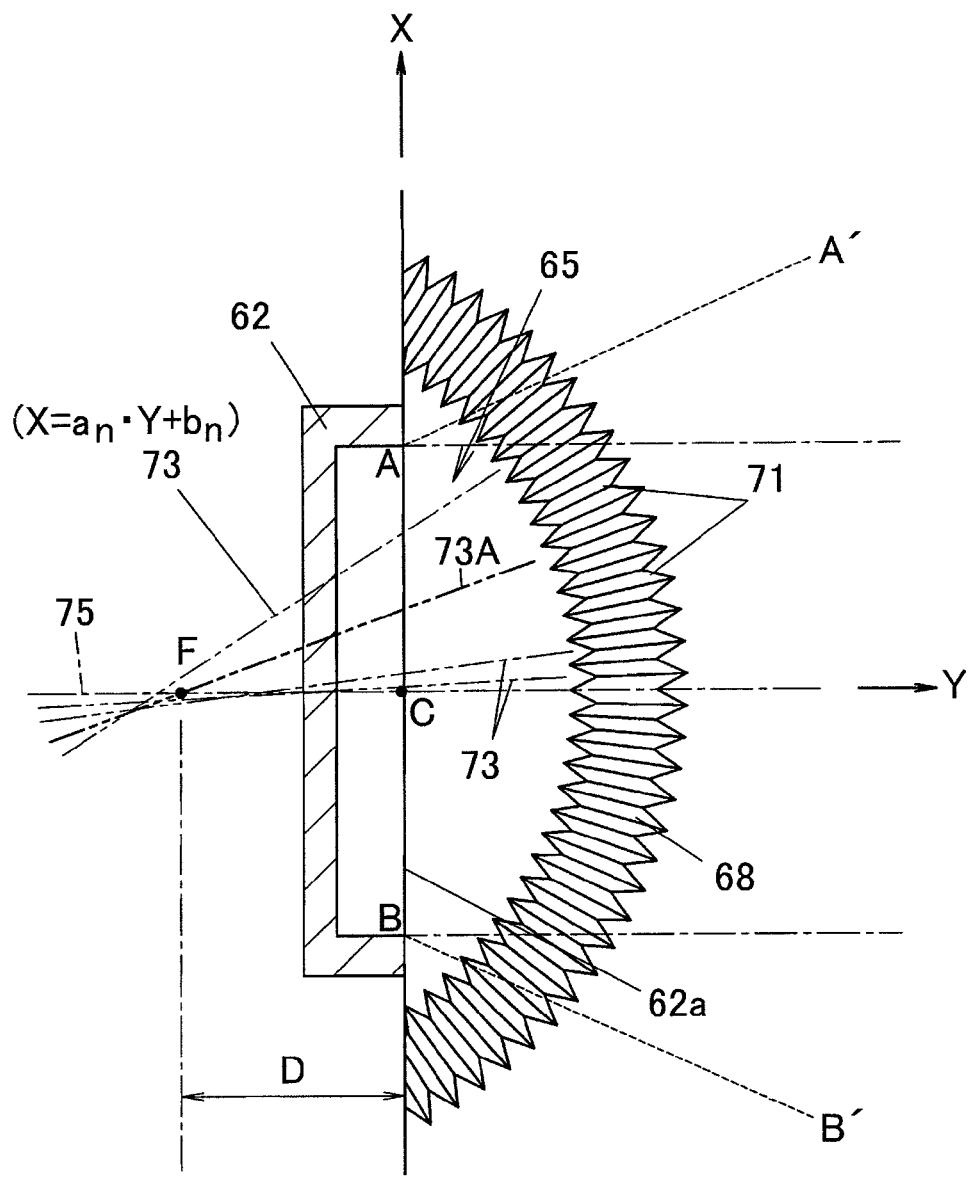
FIG. 17 is a diagram for explaining a definition of a straight line obtained by averaging longitudinal axes of respective unit patterns according to one or more embodiments of the present invention.

The above-described "straight line obtained by averaging the longitudinal axes 73 of the respective V-shaped groove structures 71" (73A or 73B) is defined as follows. As shown in FIG. 17, when viewed from a direction perpendicular to the light exit face 69 of the light guide plate 63, a coordinate origin is defined at the light source center C, an X-coordinate axis is defined in a direction parallel to a front face of the point light source 62 (light exit window 62a), and a Y-coordinate axis is defined in a direction perpendicular to the front face of the point light source 62. Then, when the number of V-shaped groove structures 71 to be handled is defined as N, these N V-shaped groove structures 71 are individually identified by an index n (n=1, 2, . . . , N). In this X-Y coordinate system, when an inclination of the longitudinal axis 73 of an n-th V-shaped groove structure 71 is denoted by $a_n$, and an X-intercept of the longitudinal axis 73 is denoted by $b_n$, the longitudinal axis 73 of each V-shaped groove structure 71 is expressed as follows.

$$X = a_n \cdot Y + b_n$$

A straight line (first straight line 73A or second straight line 73B) obtained by averaging these N longitudinal axes 73 is defined by the following equation 1.

[Equation 1]

$$X = \frac{(a_1 + a_2 + \ldots + a_N)Y + (b_1 + b_2 + \ldots + b_N)}{N} \quad \text{(Equation 1)}$$

Further, according to the equation 1, a Y-coordinate Yi at a point of intersection (first point of intersection or second point of intersection) where the straight line obtained by averaging the N longitudinal axes 73 intersects with the centerline 75 is expressed by the following equation 2.

[Equation 2]

$$Yi = -\frac{(b_1 + b_2 + \ldots + b_N)}{(a_1 + a_2 + \ldots + a_N)} \quad \text{(Equation 2)}$$

In the first modification, the point of intersection F is a point behind the light source center C. Specifically, because the point of intersection F is not at the light source center C, and the distance D from the light source center C to the point of intersection F is equal to or less than the distance 12 R, which is six times the width of the light exit window 62a, then, $$-12 R \leq Yi < 0$$

is obtained.

Figure 18:
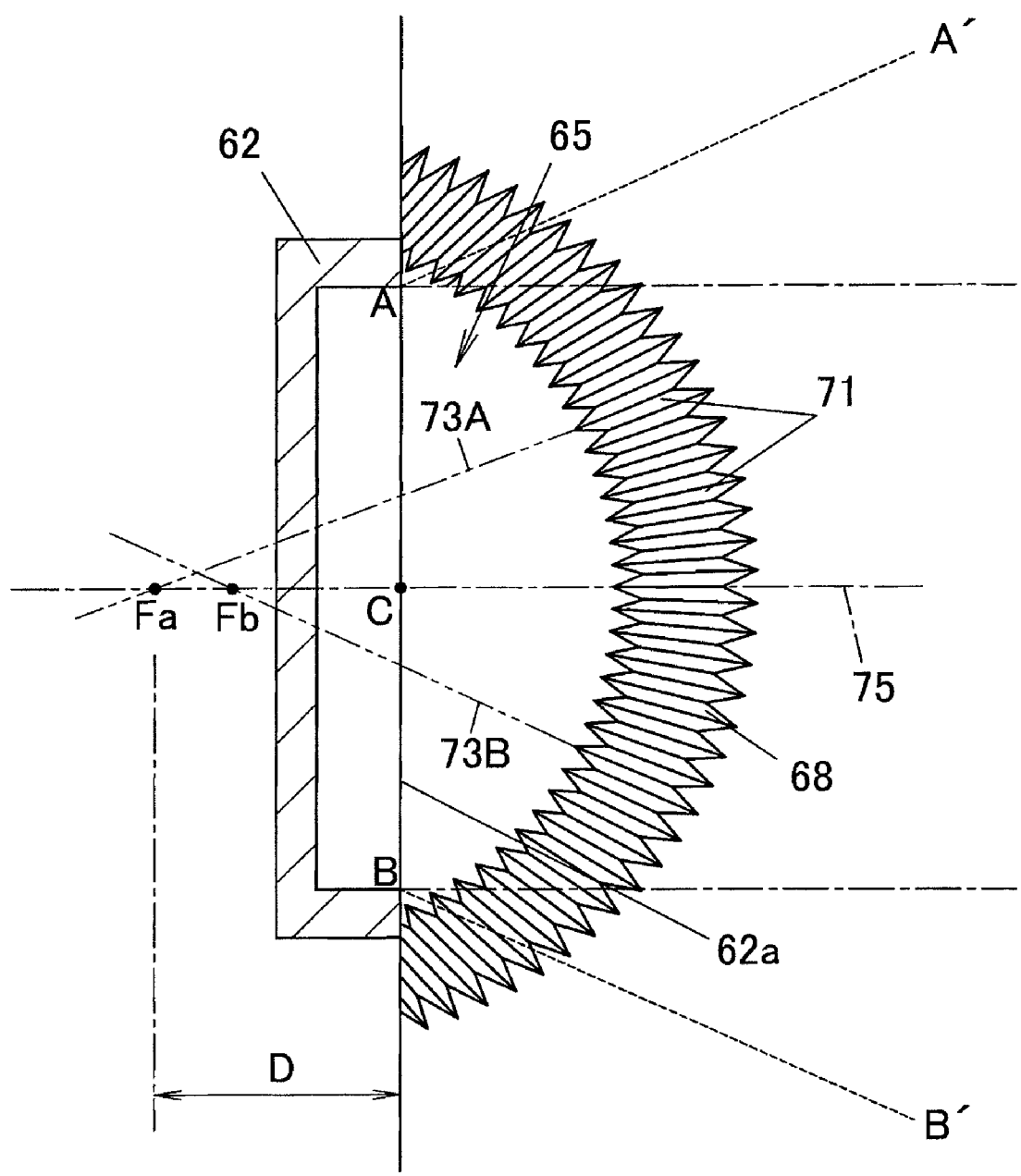
FIG. 18 is a plan view showing a second modification of the first embodiment according to one or more embodiments of the present invention.

Further, FIG. 18 is a plan view showing a second modification of the first embodiment. In this modification, when the light guide plate 63 is viewed from a direction perpendicular to the light exit face 69, a first point of intersection Fa at which a first straight line 73A intersects with the centerline 75 and a second point of intersection Fb at which a second straight line 73B intersects with the centerline 75 are points different from each other. The first point of intersection Fa is obtained by averaging the longitudinal axes 73 of the respective V-shaped groove structures 71 which is positioned in a region where light which has entered the light introducing portion 65 from the light entering end face 66 reaches and on one side of the centerline 75 of the point light source 62. The second point of intersection Fb is obtained by averaging the longitudinal axes 73 of the respective V-shaped groove structures 71 which is positioned in the region where light which has entered the light introducing portion 65 from the light entering end face 66 reaches and on the other side of the centerline 75 of the point light source 62. Both the points of intersection Fa and Fb are points behind the light source center C. Either of the points of intersection Fa and Fb is not at the light source center C, and the distance D from the light source center C to each of them is equal to or less than the distance 12 R, which is six times the width of the light exit window 62a. Further, it is desired that the points of intersection Fa and Fb are in the vicinity of the point of intersection G between the inscribed circle 74 of the directivity converting pattern 68 and the centerline 75. Incidentally, in FIG. 18, the second point of intersection Fb is closer to the light source center C than the first point of intersection Fa, but the second point of intersection Fb may be farther from the light source center C.

Second Embodiment

Figure 19:
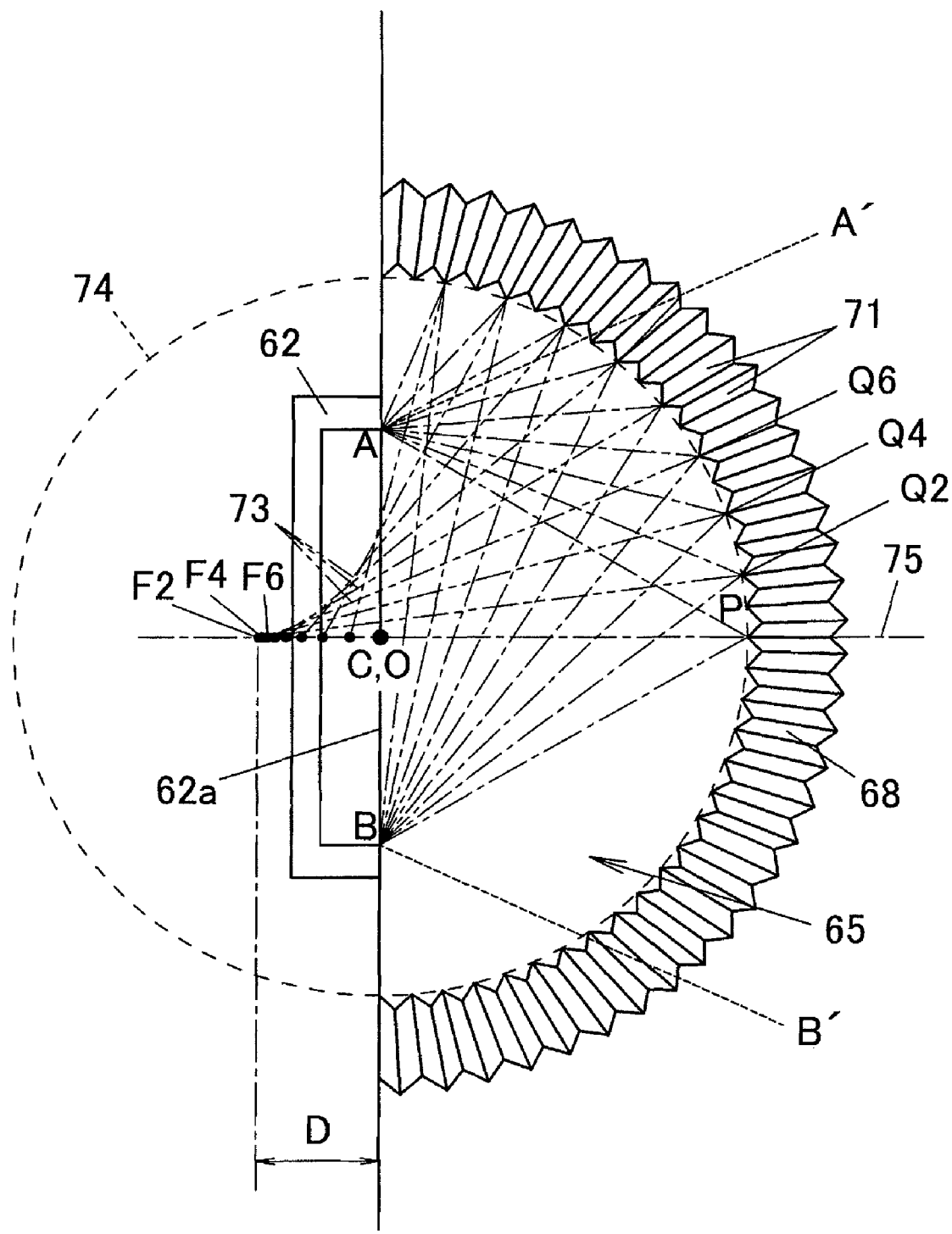
FIG. 19 is a plan view showing a light introducing portion of a surface light source device according to a second embodiment of the present invention.
Figure 20:
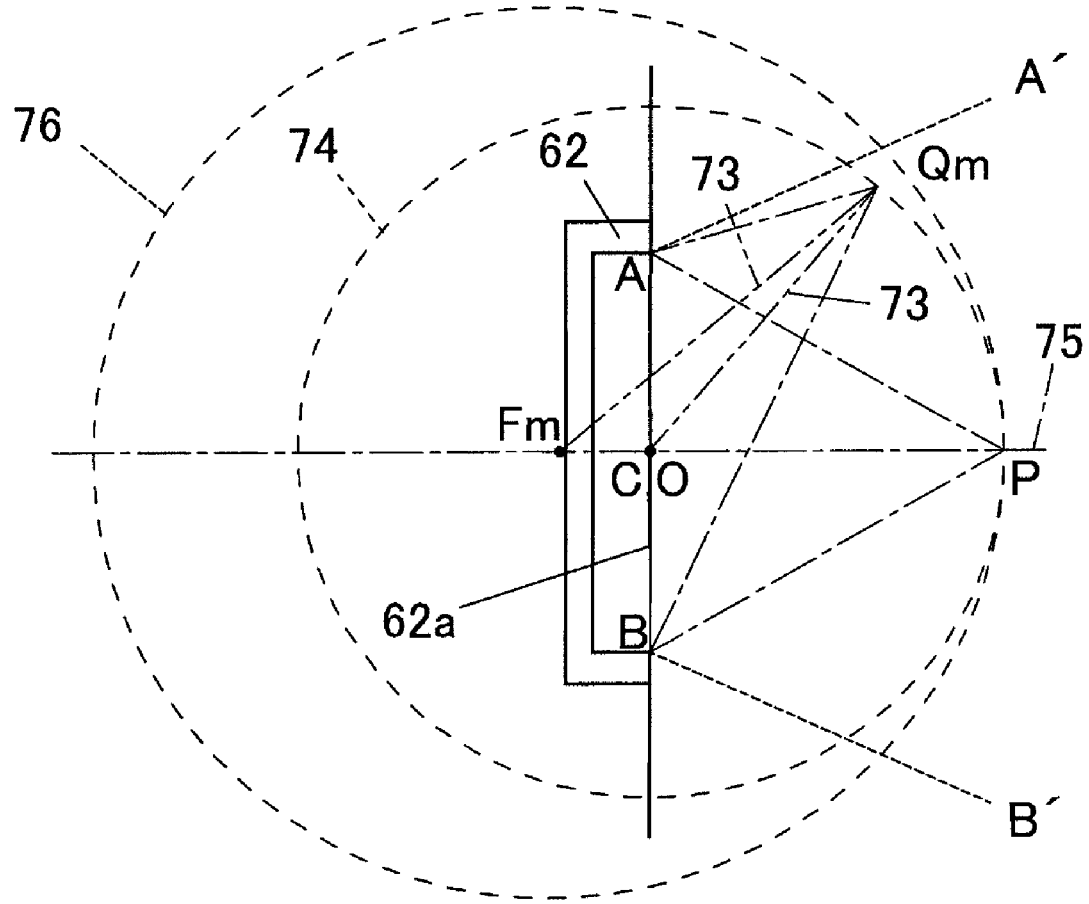
FIG. 20 is an explanatory diagram of a function of the light introducing portion according to the second embodiment of the present invention.

FIG. 19 is a plan view showing a light introducing portion 65 of a surface light source device according to a second embodiment of the present invention. FIG. 20 is an explanatory diagram of the second embodiment. As shown in FIG. 19, in the second embodiment, the directivity converting pattern 68 is formed such that the center O of the inscribed circle 74 coincides with the light source center C. Hereafter, ends on the inner peripheral side of the respective V-shaped groove structures 71 are denoted by Q1, Q2, Q3, . . . in this order from the V-shaped groove structure 71 closer to the centerline 75, and points at which the longitudinal axes 73 of the respective V-shaped groove structures 71 intersects with the centerline 75 are denoted by F1, F2, F3, . . . . Then, directions of the respective longitudinal axes 73 are set such that an angle ∠AQmFm between a straight line AQm connecting the one end A of the light exit window 62a and the end Qm (m=1, 2, . . . ) on the inner side of the V-shaped groove structure 71 and the longitudinal axis 73 of the V-shaped groove structure 71 and an angle ∠BQmFm between a straight line BQm connecting the other end B of the light exit window 62a and the end Qm on the inner side of the V-shaped groove structure 71 and the longitudinal axis 73 of the V-shaped groove structure 71 are equal to each other.

As shown in FIG. 20, in the case where the longitudinal axes 73 of the respective V-shaped groove structures 71 intersect with each other at the light source center C (that is, the case of the comparative example in FIG. 9), angles of incidence ∠AQmC and ∠BQmC on both sides of the longitudinal axis 73 do not become equal to each other, and therefore reduction in the efficiency or light leakage tends to be caused. On the other hand, when the direction of the longitudinal axis 73 is changed such that the point Fm at which the longitudinal axis 73 intersects with the centerline 75 is displaced behind the light source center C, the angles of incidence ∠AQmC and ∠BQmFm on both sides of the longitudinal axis 73 can be made equal to each other, so that the light-use efficiency can be further improved, and light leakage from the light introducing portion 65 can be reduced. As a result, as shown in FIG. 19, the point Fm at which the longitudinal axis 73 of the V-shaped groove structure 71 intersects with the centerline 75 moves closer to the light source center C as the V-shaped groove structure 71 moves farther from the centerline 75.

Incidentally, a circle 76 in FIG. 20 expresses a circle centered at the point Fm. That is, FIG. 20 shows similarity of changing the directions of the longitudinal axes 73 of the respective V-shaped groove structures 71, like this embodiment, with displacing the center of the inscribed circle of the V-shaped groove structures 71 behind the light exit window 62a, like the circle 76.

Figure 21:
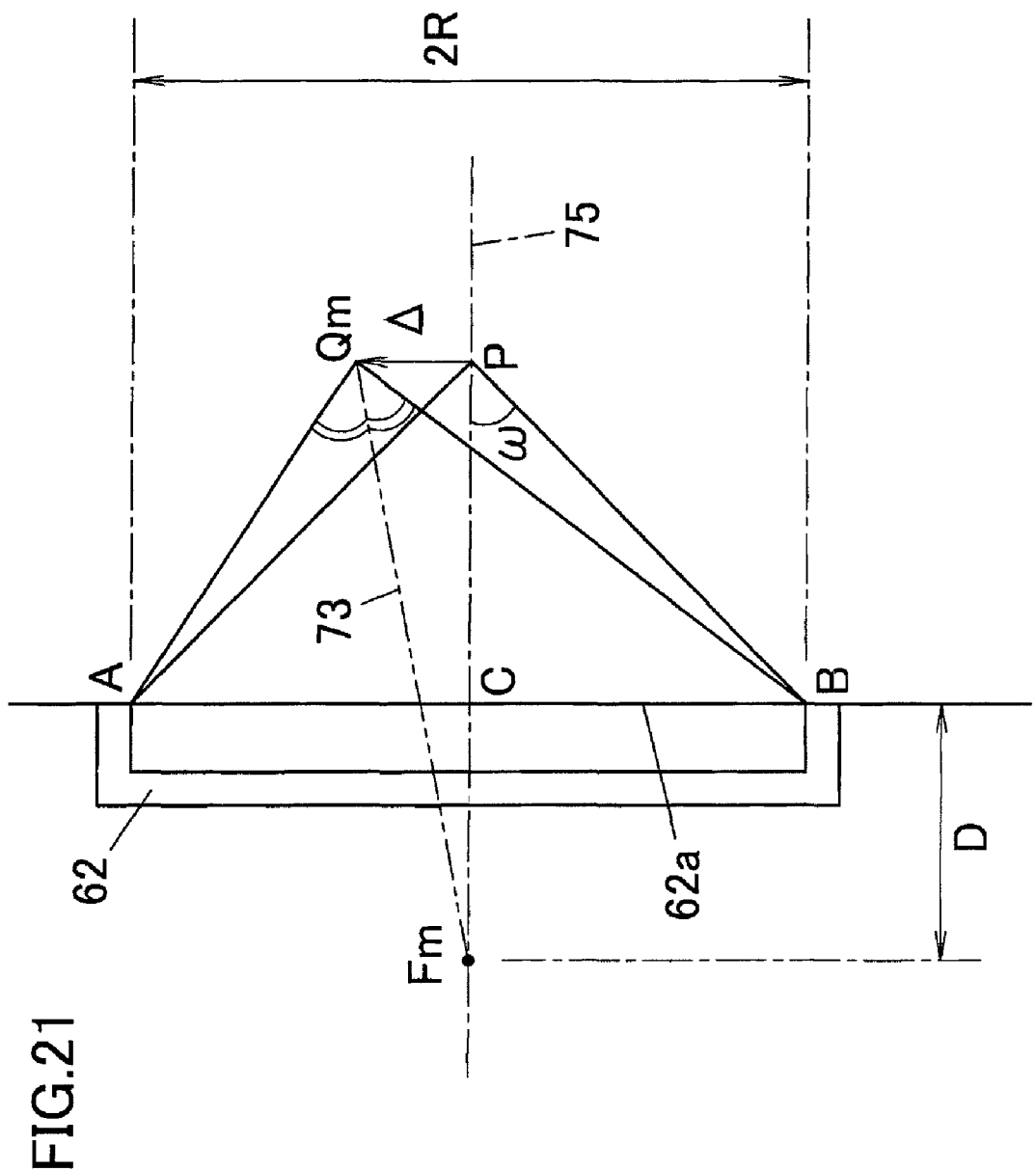
FIG. 21 is a diagram showing a point of intersection between a longitudinal axis of a V-shaped groove structure deviating from a centerline by a slight distance Δ and the centerline according to one or more embodiments of the present invention.
Figure 22:
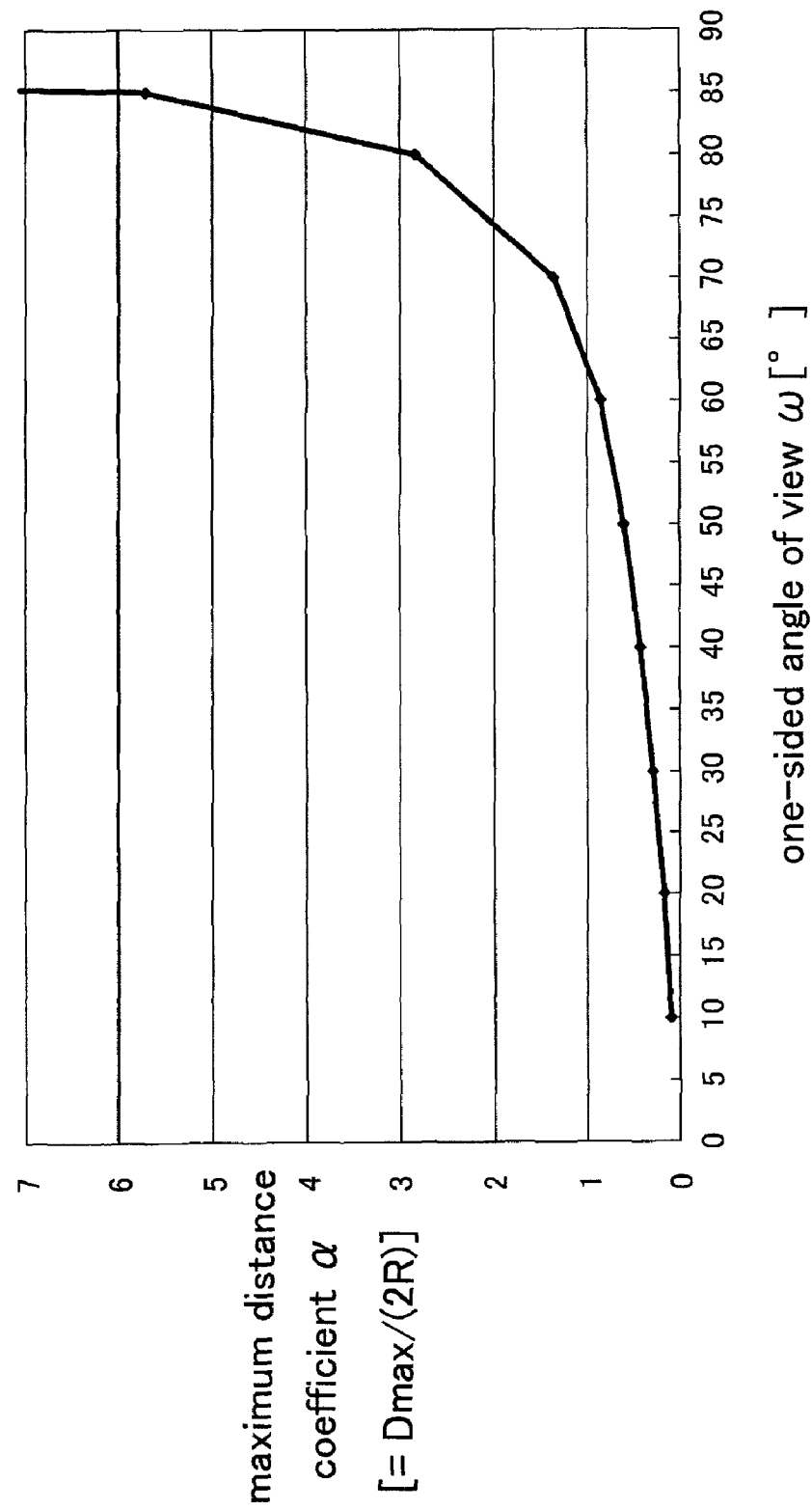
FIG. 22 is a graph showing a relationship between a maximum distance coefficient α and a one-sided angle of view ω according to one or more embodiments of the present invention.

FIGS. 21 and 22 are a diagram and a graph for explaining a relationship between the distance D between the point of convergence F of the longitudinal axes 73 and the light source center C and the one-sided angle of view ω in the second embodiment. As shown in FIG. 21, the point P on the centerline 75 at which the one-sided angle of view is ω is assumed, and the point Qm displaced by a slight distance Δ from the point P is assumed. The expansion of light incident on the point Qm is ∠AQmB, and if the direction of the longitudinal axis 73 of the V-shaped groove structure 71 located at the point Qm is set so as to coincide with a bisector of the angle ∠AQmB, the distance D(=FmC) between the point of intersection Fm between the longitudinal axis 73 and the centerline 75 and the light source center C increases as the slight distance Δ approaches zero, and therefore a maximum value Dmax of the distance D can be determined as a limit of Δ→0. This maximum value Dmax is expressed as a function of the one-sided angle of view ω, and therefore, if the following definition is provided:

Maximum distance coefficient α=Dmax/(2 R), the maximum distance coefficient α is also expressed as a function of the one-sided angle of view ω.

FIG. 22 is a graph showing a relationship between a one-sided angle of view ω and a maximum distance coefficient α, where a horizontal axis indicates the one-sided angle of view ω, while a vertical axis indicates the maximum distance coefficient α. According to FIG. 22, as the one-sided angle of view ω increases, the maximum distance coefficient α also increases monotonously. The maximum distance coefficient α sharply increases when the one-sided angle of view ω exceeds 80°, but a region where the one-sided angle of view ω is >80°, or the maximum distance coefficient α>6 is unusual. According to FIG. 12 the percentage of maximum leakage light is 15% when the one-sided angle of view ω is 90° or less, but it has been found that, if such unusualness is taken into account, the percentage of maximum leakage light can be optimized and made equal to or less than 15% when the one-sided angle of view ω is 80° or less, or the maximum distance coefficient α is six times or less. Consequently, the longitudinal axis 73 of an optimal V-shaped groove structure 71 intersects with the centerline 75 within a range of six times the width 2 R of the light exit window 62a or less as measured from the light source center C. Incidentally, an LED having a width of 10 mm or more does not exist at present, and consequently the point of intersection Fm between the longitudinal axis 73 and the centerline 75 is located within 60 mm from the light source center C.

For example, when the one-sided angle of view ω is 30°, the maximum distance coefficient α=0.29 is obtained according to FIG. 22, and therefore, when the width 2 R of the light exit window 62a is 2 mm, the distances of all or almost all of the points of intersection F from the light source center C may be set at 0.29×2 mm=0.58 mm or less.

Incidentally, the description regarding FIG. 22 holds true for the first embodiment or the like.

Figure 23:
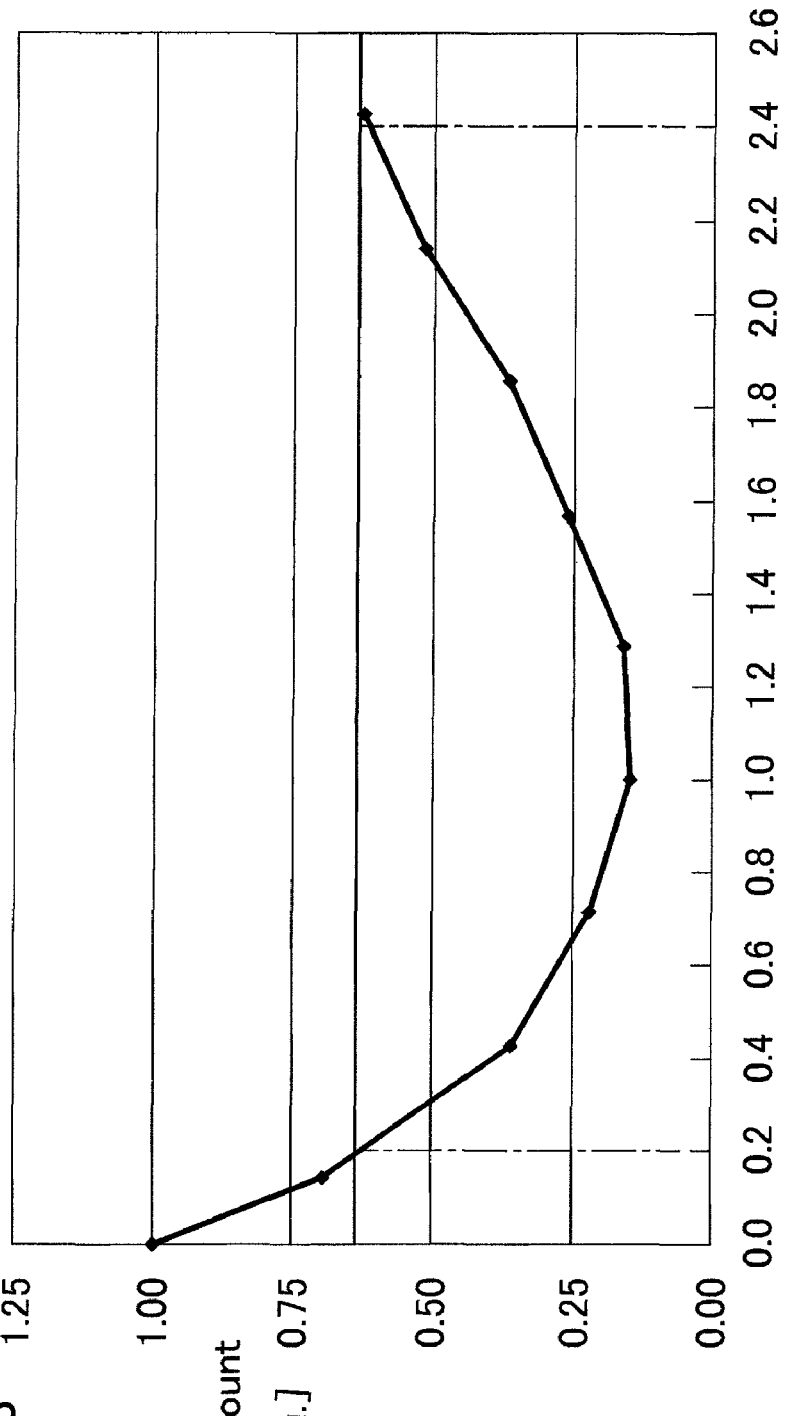
FIG. 23 is a graph showing a relationship between a distance D between a point of convergence F and a light source center C and a leakage amount of light according to one or more embodiments of the present invention.

FIG. 23 is a graph showing a relationship between the distance D between the point of convergence F and the light source center C and a leakage amount of light. A horizontal axis in FIG. 23 indicates a value normalized by dividing the distance D between the point of convergence F and the light source center C by the maximum distance Dmax=(2 R×α), while a vertical axis indicates a ratio of the leakage amount of light. According to FIG. 23, within a range of D/Dmax of 0.2 to 2.4, the leakage amount decreases to ⅔ or less of the leakage amount when the longitudinal axes 73 of the respective V-shaped groove structures 71 converge on the light source center C (that is, in the case of D/Dmax=0), which can be said to be sufficiently effective. For example, when the one-sided angle of view ω is 30°, the maximum distance coefficient α=0.29 is obtained according to FIG. 22, still when the width 2 R of the light exit window 62a satisfies 2 R=2 mm, such setting is sufficiently effective that the distances of the points of intersection F of all or almost all of the longitudinal axes from the light source center C are in a range of at least 0.29×2 mm×0.2=0.116 mm or more.

Incidentally, the maximum distance coefficient α sharply increases when the one-sided angle of view ω exceeds 80°, but this region where the one-sided angle of view ω satisfies ω>80° is unusual, and it has been found that such a trend as shown in FIG. 23 appears when α is a value of 6 or less.

Modifications of the Second Embodiment

Figure 24:
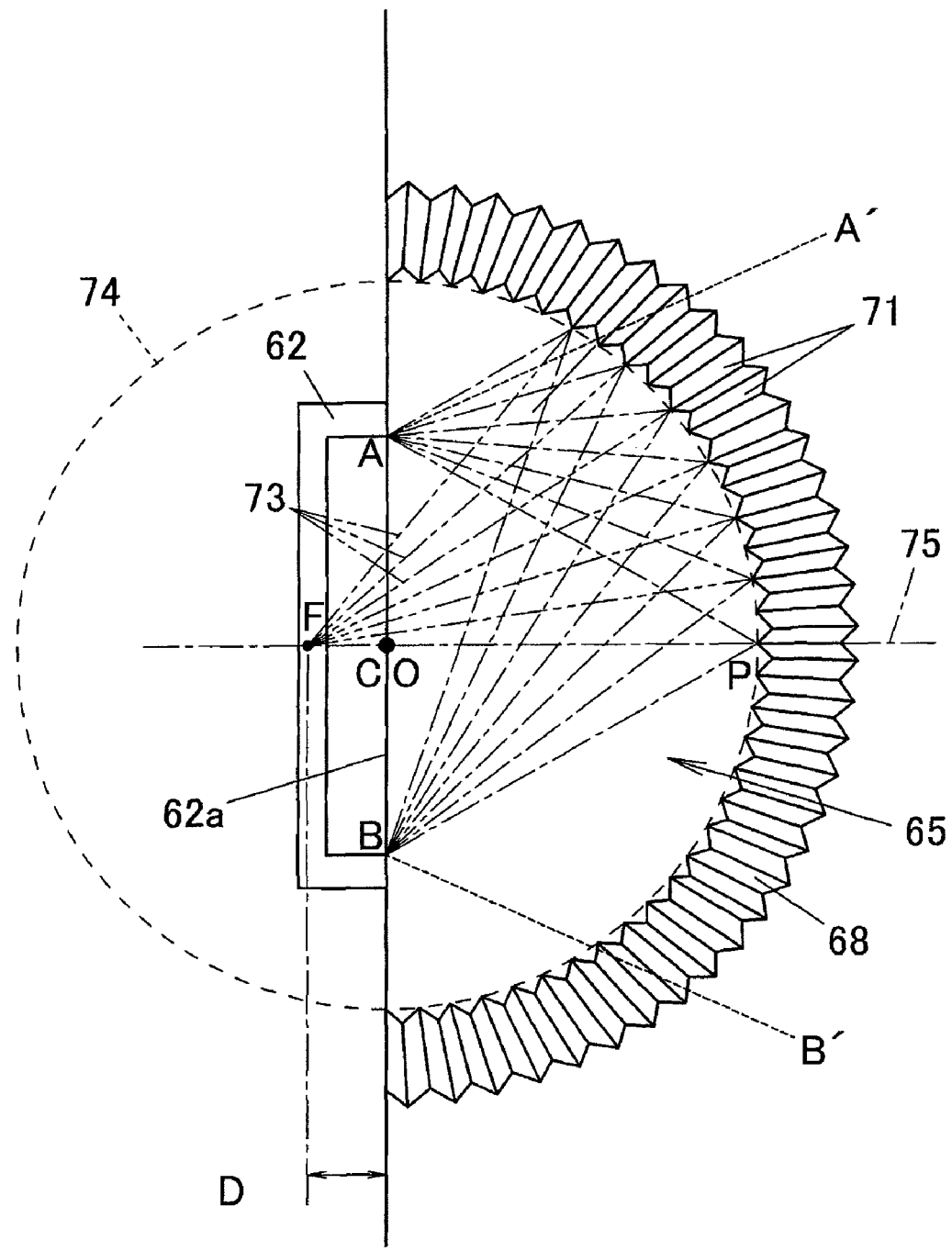
FIG. 24 is a plan view showing a first modification according to the second embodiment of the present invention.

FIG. 24 is a plan view showing a first modification of the second embodiment. In the second embodiment, the positions of the points of intersection F1, F2, . . . between the longitudinal axes 73 of the respective V-shaped groove structures 71 and the centerline 75 are shifted little by little, but in the first modification of the second embodiment, the longitudinal axes 73 of the respective V-shaped groove structures 71 are configured to intersect with each other at an approximately-average position F of the points of intersection F1, F2, . . . in the second embodiment. Note that the point of intersection F is positioned within a range of the distance D=12 R from the light source center C.

Also in such a modification, in the respective V-shaped groove structures 71, the angles of incidence ∠AQmC and ∠BQmC on both sides of the longitudinal axis 73 can be made approximately equal to each other, so that the light-use efficiency can be improved, and the light leakage can also be reduced.

Figure 25:
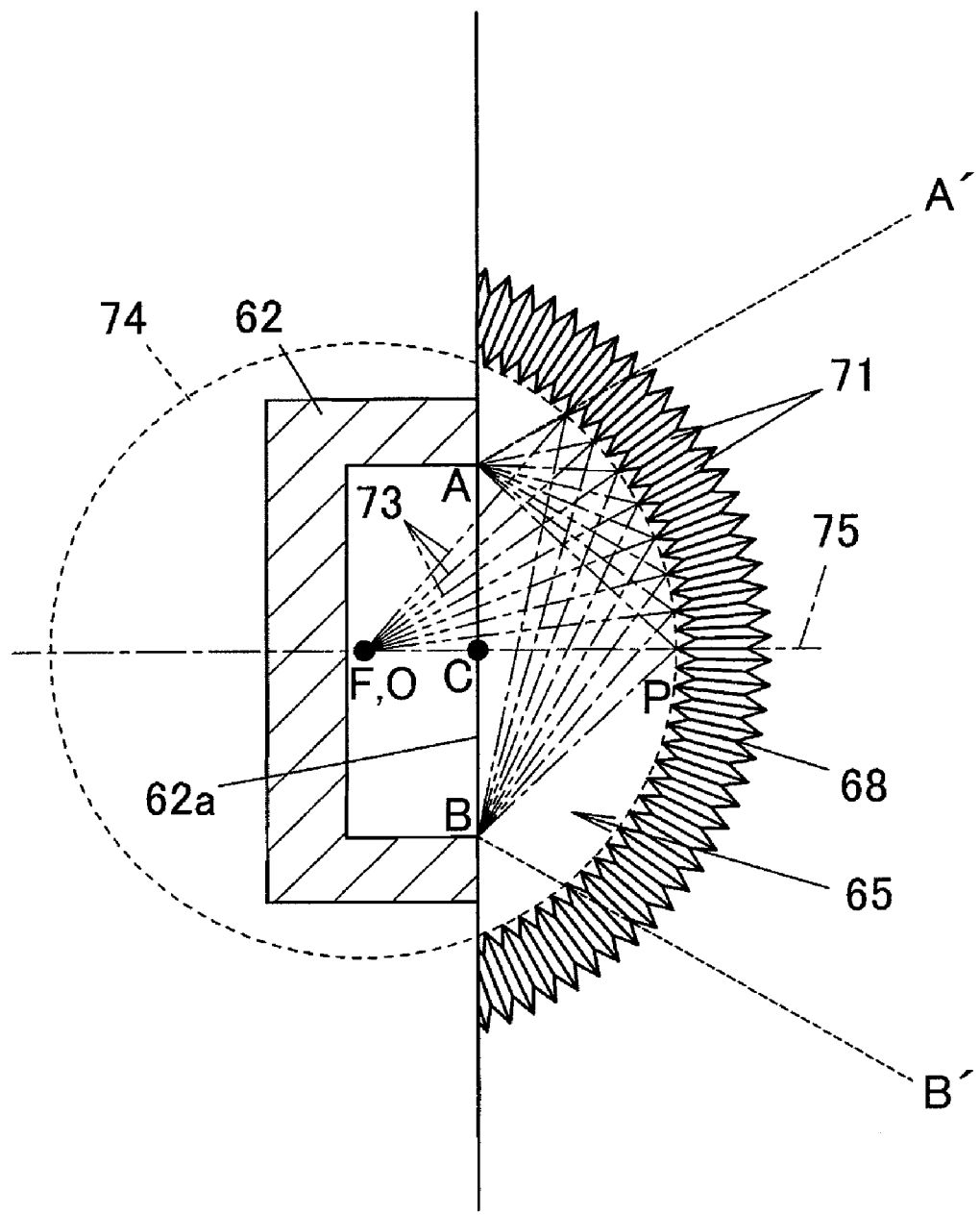
FIG. 25 is a plan view showing a second modification according to the second embodiment of the present invention.

Further, FIG. 25 is a plan view showing a second modification of the second embodiment. In the second modification, the directivity converting pattern 68 is formed such that the center O of the inscribed circle 74 is positioned behind the light source center C of the point light source 62. Further, the respective V-shaped groove structures 71 are formed such that the longitudinal axes 73 converge on the center O of the inscribed circle 74 and that the point of intersection F coincides with the center O. That is, the light introducing portion 65 in FIG. 25 has a structure obtained by moving such an entire light introducing portion 35 as the comparative example shown in FIG. 9 backward.

Incidentally, in the second embodiment and the first and second modification thereof shown in FIGS. 19 to 25, such a configuration can be adopted that the V-shaped groove structures 71 are not provided or they are formed to have any shape in a region outside the straight line A-A' or a region outside the straight line B-B' which light does not reach. Further, similarly, when the light guide plates 63 are viewed from the direction perpendicular to the light exit window 69, a straight line which is positioned in a region where light which has entered the light introducing portion 65 from the light entering end face 66 reaches and which is obtained by averaging the longitudinal axes 73 of the respective V-shaped groove structures 71 positioned on one side of the centerline 75 of the point light source 62, and a straight line which is positioned in a region where light which has entered the light introducing portion 65 from the light entering end face 66 reaches and which is obtained by averaging the longitudinal axes 73 of the respective V-shaped groove structures 71 positioned on the other side of the centerline 75 of the point light source 62 intersect with each other at one point on the centerline 75.

Third Embodiment

Figure 26:
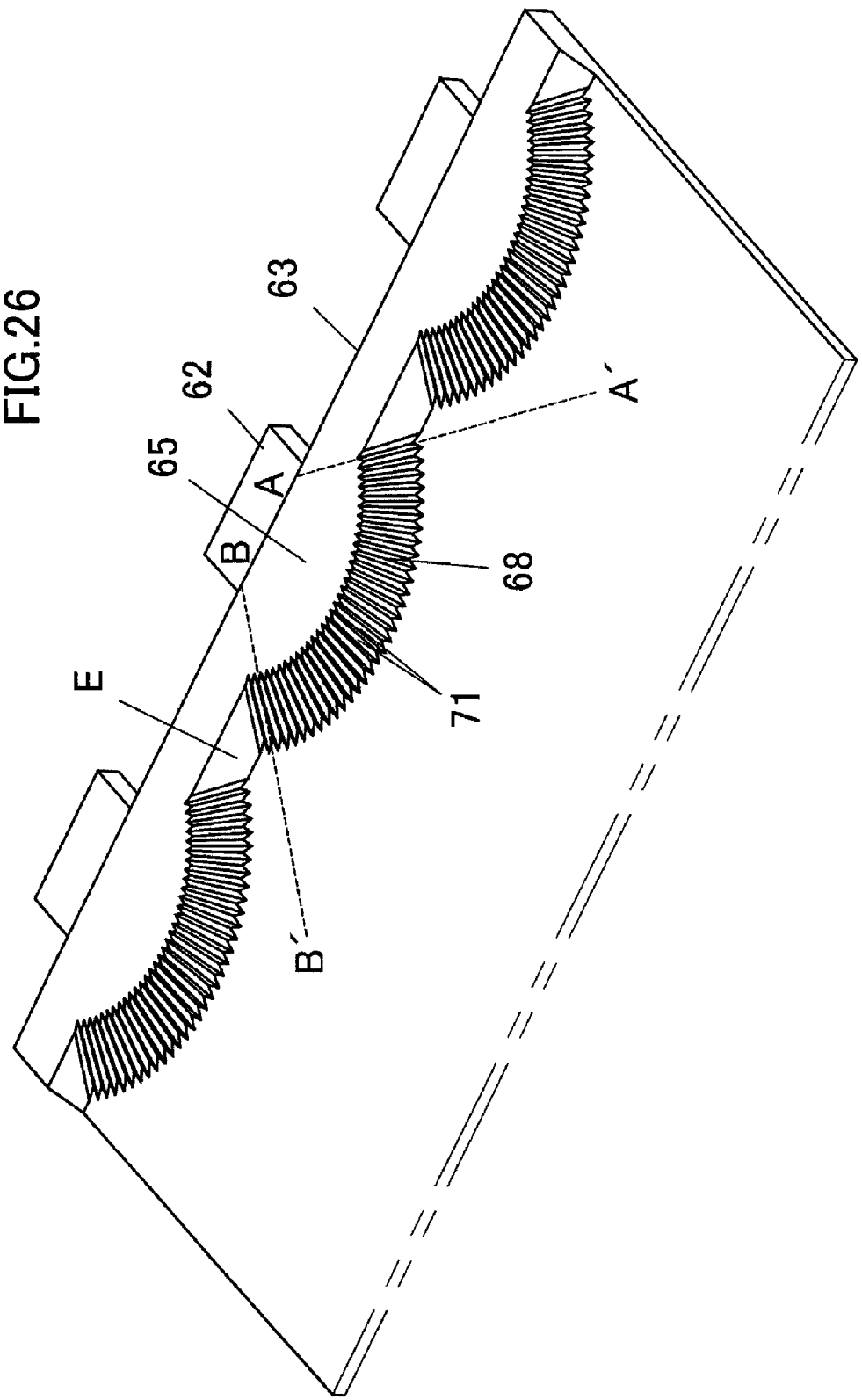
FIG. 26 is a perspective view showing a light introducing portion of the surface light source device according to a third embodiment of the present invention.

FIG. 26 is a perspective view showing a light introducing portion 65 of a surface light source device according to a third embodiment of the present invention. This surface light source device is configured to allow a plurality of point light sources 62 to be arranged and used, and the directivity converting pattern 68 having the shape of a substantial arc is provided in front of each of the point light sources 62. Because the light that has entered from the light entering end face of the light introducing portion 65 has a conical directional characteristic, when the light is viewed from the direction perpendicular to the light exit face, an expansion in the light introducing portion 65 of the light that has entered from the light entering end face is smaller than 180° (as described above, when the refractive index of the light guide plate is 1.59, the expansion of light becomes 78°). Therefore, also in the case where the arc-like directivity converting patterns 68 are arranged side by side, the shape of the pattern or the direction of the pattern in a region E which light does not reach and which is positioned between the directivity converting patterns 68 can be freely formed. In this regard, however, adjacent regions which the light of the directivity converting patterns 68 reaches are configured not to overlap with each other. Alternatively, the directivity converting pattern 68 does not have to be provided in the region E which light does not reach and which is positioned between the directivity converting patterns 68. Further, when a plane of incidence of light is not a flat face but has a pattern to change expansion of incident light, the expansion should be taken into account.

Figure 27:
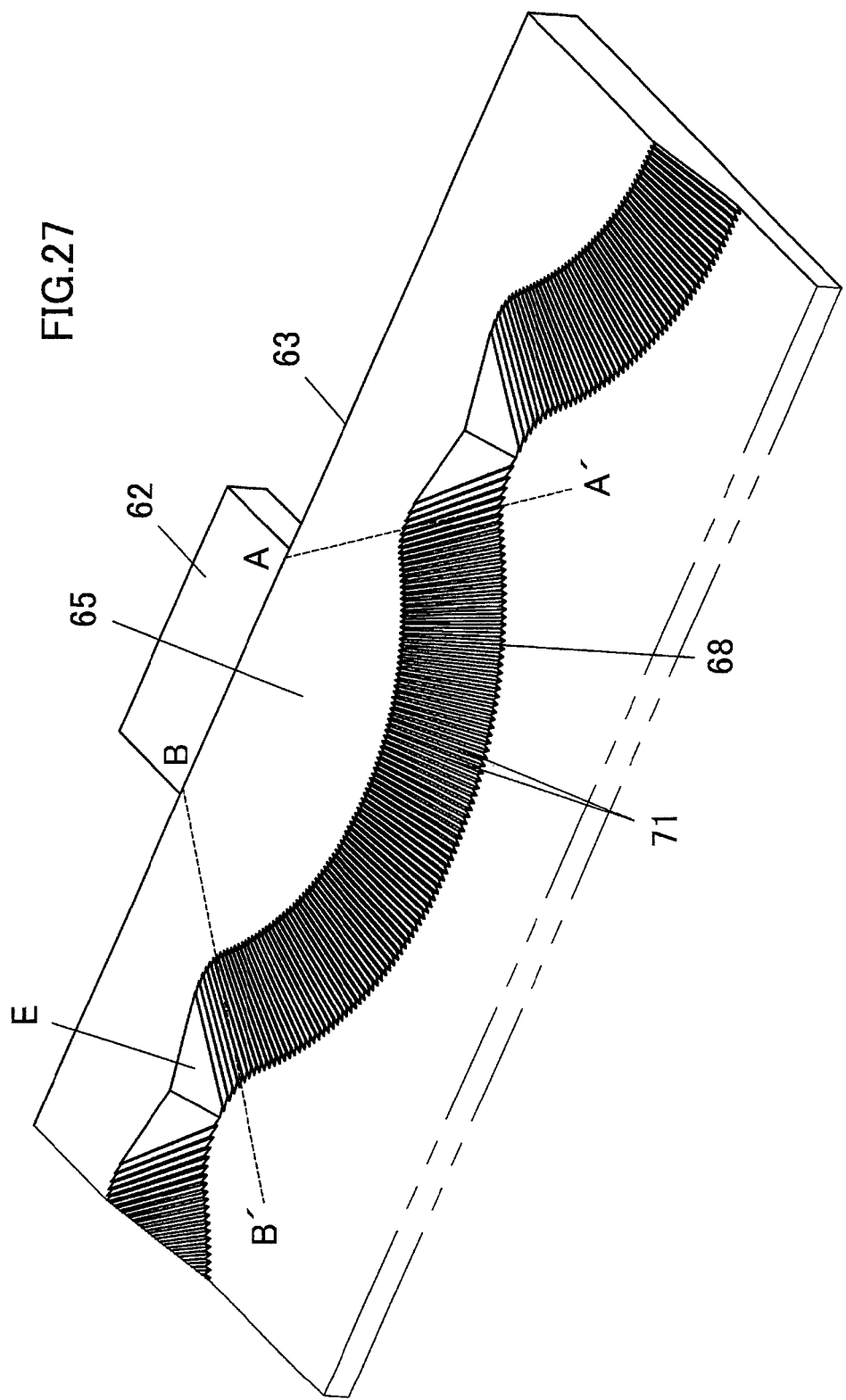
FIG. 27 is a perspective view showing the light introducing portion of the surface light source device according to another example of the third embodiment of the present invention.

FIG. 27 is a diagram showing a modification of the third embodiment, and the modification is configured such that the adjacent directivity converting patterns 68 are smoothly connected with each other.

Fourth Embodiment

Figure 28:
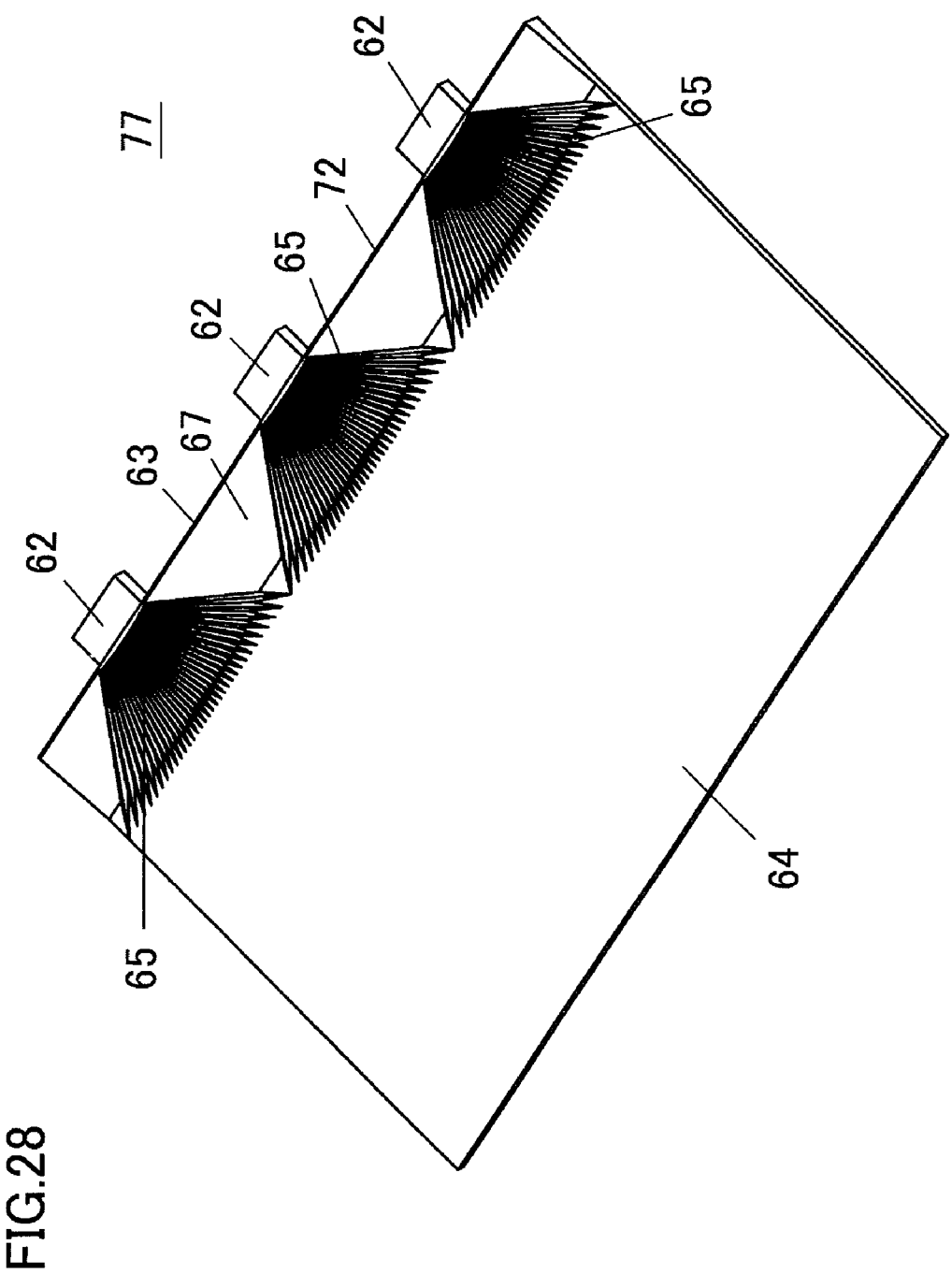
FIG. 28 is a perspective view showing a surface light source device according to a fourth embodiment of the present invention.
Figure 29:
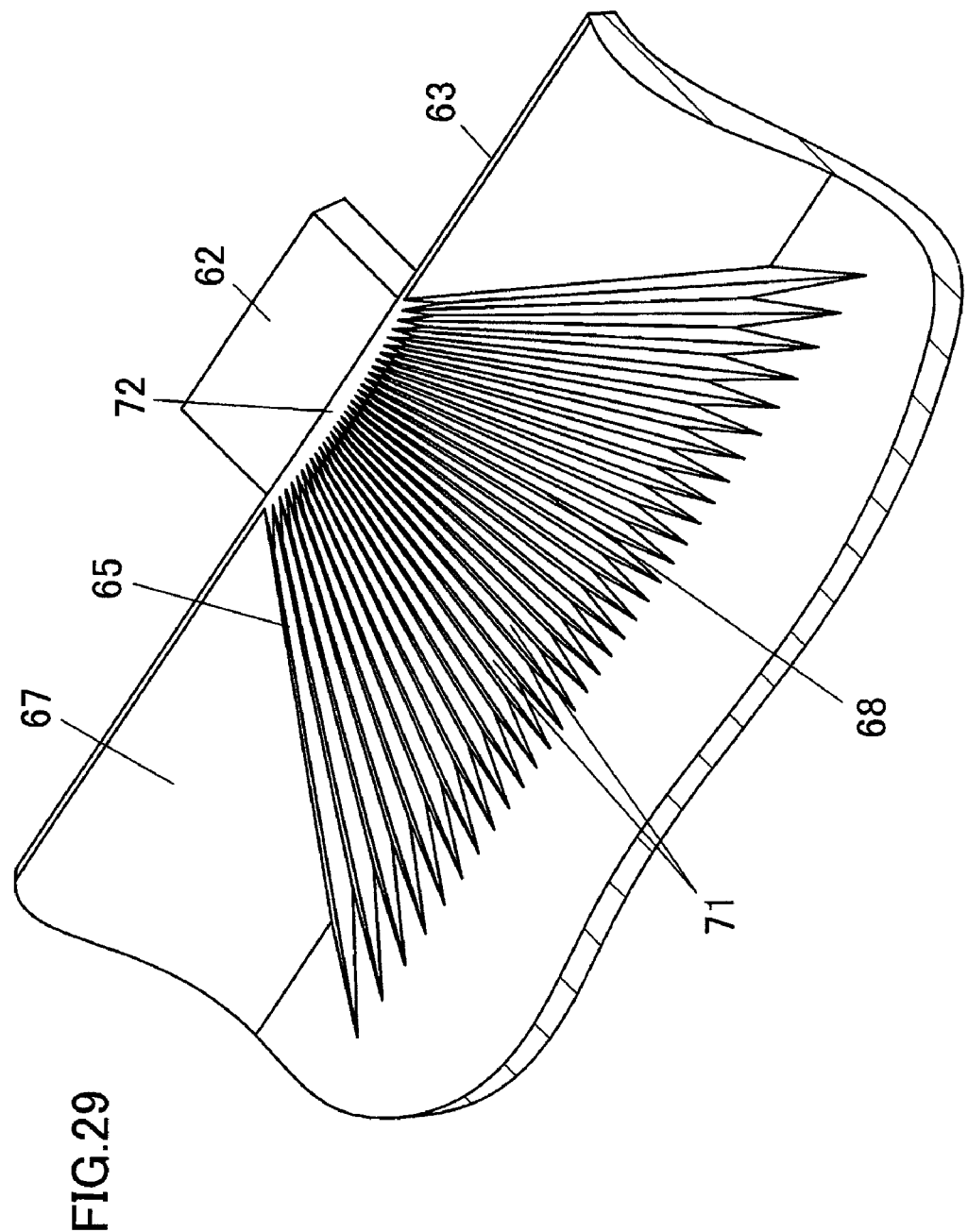
FIG. 29 is an enlarged perspective view showing a portion of the light introducing portion of the surface light source device according to the fourth embodiment of the present invention.

FIG. 28 is a perspective view showing a surface light source device 77 according to a fourth embodiment of the present invention. FIG. 29 is a perspective view showing one directivity converting pattern 68 in an enlarged manner. This surface light source device 77 is configured to allow a plurality of point light sources 62 to be arranged and used, and the light introducing portions 65 are provided in front of the respective point light sources 62. At an end portion of a light guide plate 63, a flat upper face 72 having a narrow width is provided in parallel with an end face thereof, and a inclined face 67 is provided from the upper face toward the light guide plate body 64 linearly along a widthwise direction of the light guide plate 63. In front of the respective point light sources 62, the directivity converting patterns 68 are provided in a trapezoidal region along the inclined face so as not to overlap with each other. Both an edge of the directivity converting pattern 68 on a side near the point light source 62 and an edge thereof on a side far from the point light source 62 are linear, and the one-sided angles of view are 90°. The directivity converting pattern 68 is composed of a plurality of the V-shaped groove structures 71 arranged radially, and the longitudinal axes of the respective V-shaped groove structures 71 converge or intersect behind the center of the light exit window of the point light source 62.

According to such an embodiment, because the directivity converting pattern 68 can be formed on the simple inclined face 67, manufacture of the directivity converting pattern 68 can be facilitated.

Figure 30:
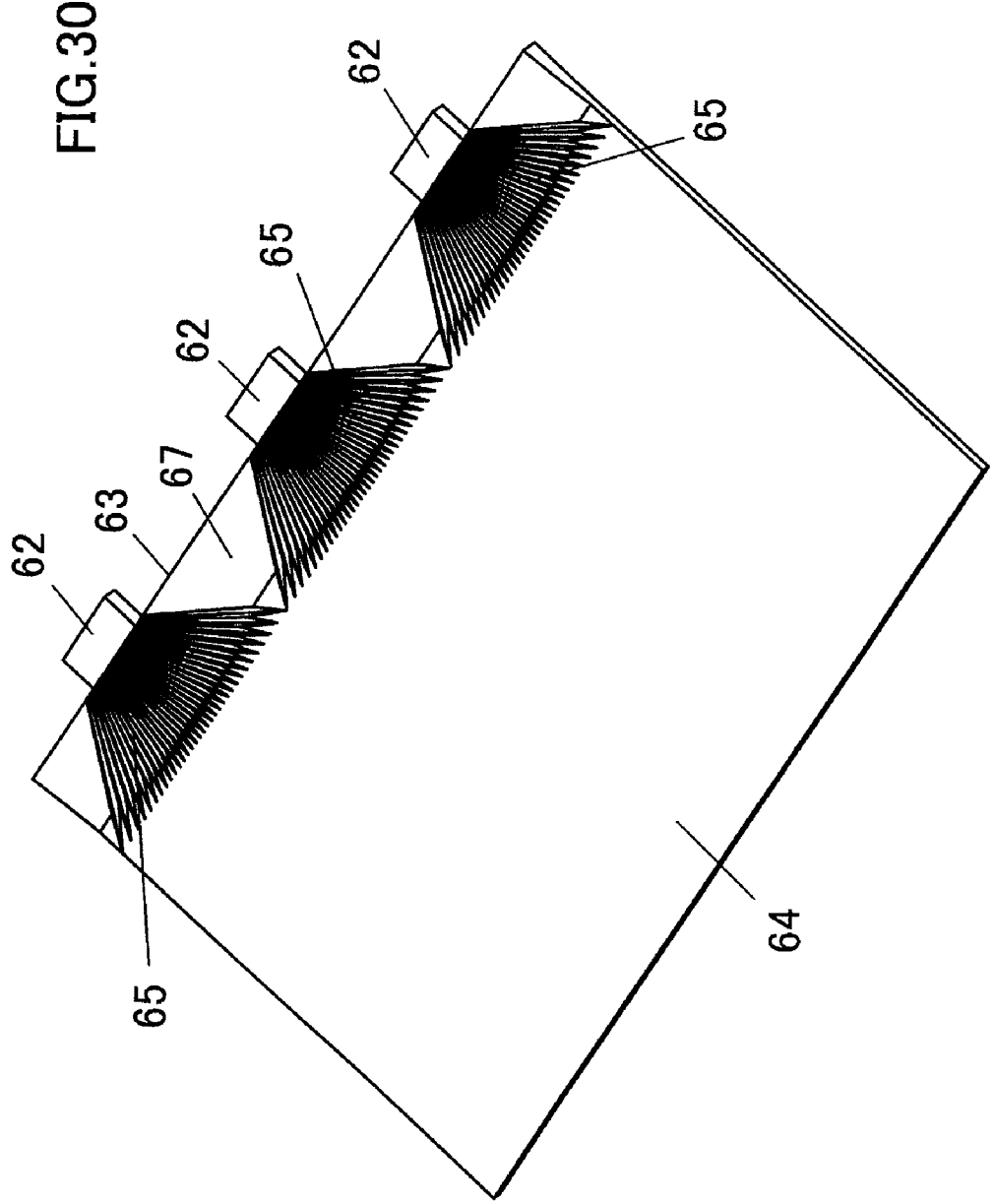
FIG. 30 is a perspective view showing a surface light source device according to another example of the fourth embodiment of the present invention.
Figure 31:
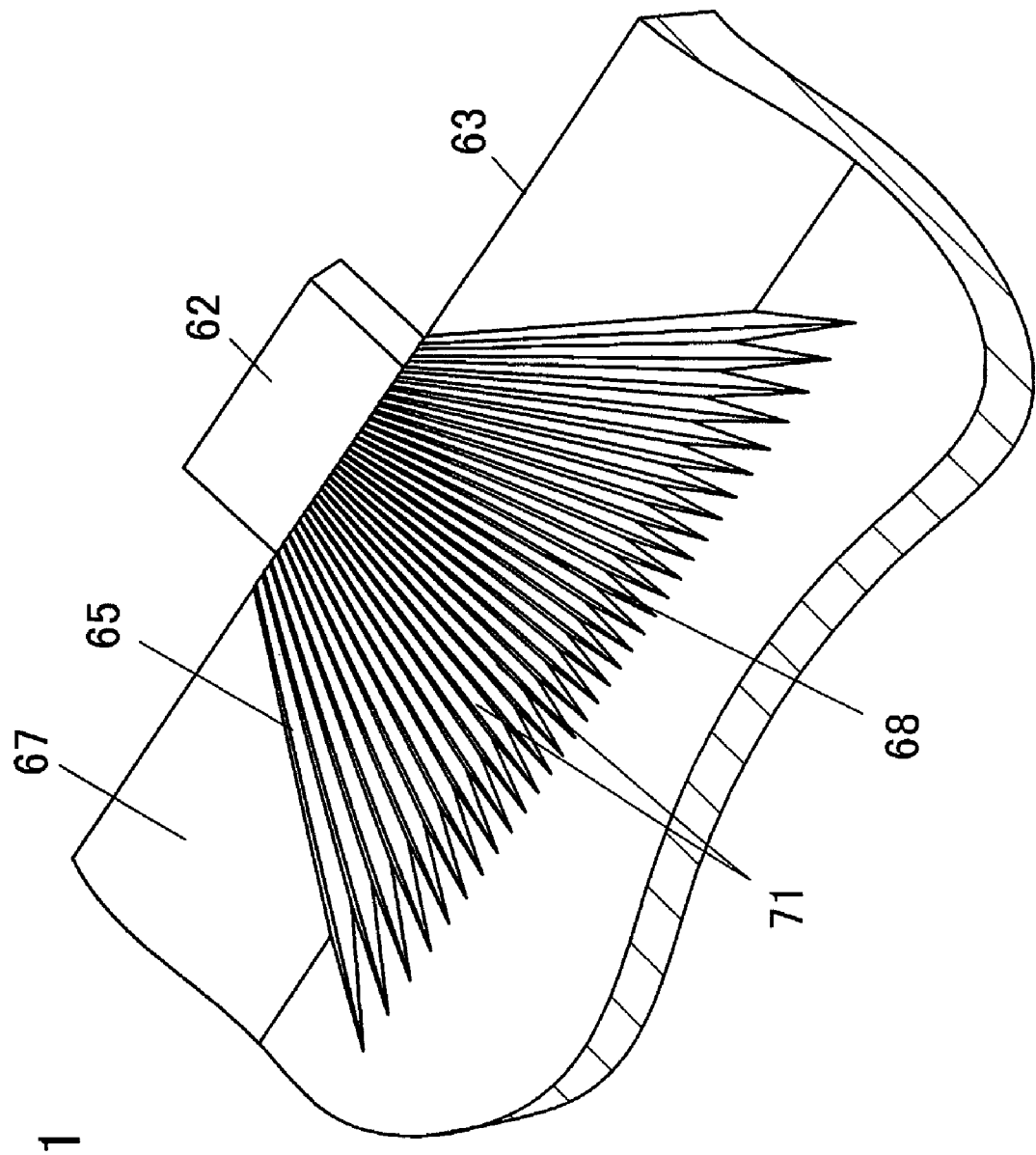
FIG. 31 is a perspective view showing a portion of the light introducing portion of the surface light source device according to another example of the fourth embodiment of the present invention.

FIG. 30 is a perspective view showing a modification of the fourth embodiment, and FIG. 31 is a perspective view showing one of directivity converting patterns 68 of the modification in an enlarged manner. In this modification, the flat upper face 72 at the end of the inclined face 67 is eliminated so that the end of the directivity converting pattern 68 (or the V-shaped groove structures 71) reaches the end of the light guide plate 63.

Fifth Embodiment

Regarding the embodiments described hereinbefore, a method for eliminating light leakage from a light guide plate by using a unit pattern of a V-shaped groove structure has been considered, but hereinafter a more generalized structure will be described. That is, such a unit pattern of a V-shaped groove structure as described above does not necessarily have to be used, and, if a directivity converting pattern composed of a unit pattern (or recessed/projecting structure having recesses or projections) extending in a radial direction from around a point located behind the light source center of the point light source is used to expand the directivity of light reflected by the directivity converting pattern in a direction approximately perpendicular to a light source direction (a direction connecting a point of reflection of light and the light source center of the point light source), an expansion of directivity of the light guide plate of the light that has entered the light introducing portion in a thickness direction can be converted into a directivity characteristic inclined to a direction parallel to a planar direction of the light guide plate, so that light leakage in the light introducing portion 65 can be reduced.

Because the reason for this was explained in detail in the patent document 4 (in particular, paragraphs 0138 to 0141, FIGS. 55 to 57, etc.), the explanation in the patent document 4 is incorporated therein, and thus the details are omitted.

Figure 32A:
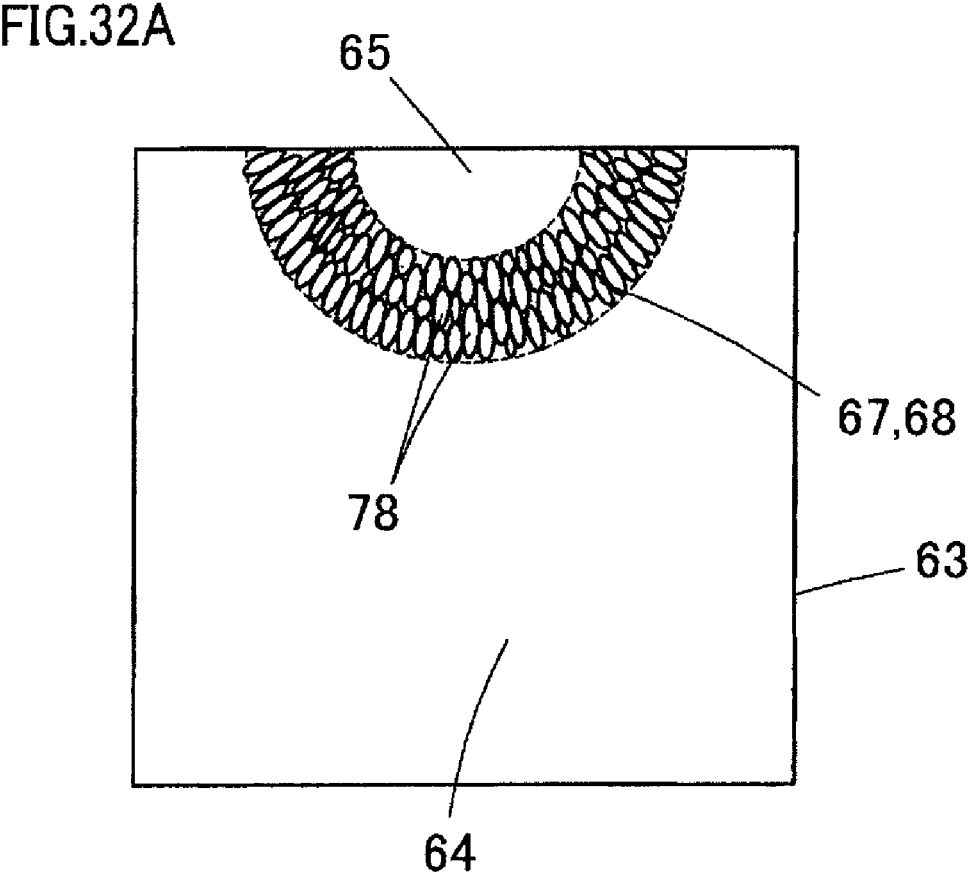
FIG. 32A is a schematic plan view of a light guide plate according to a fifth embodiment of the present invention.
Figure 32B:
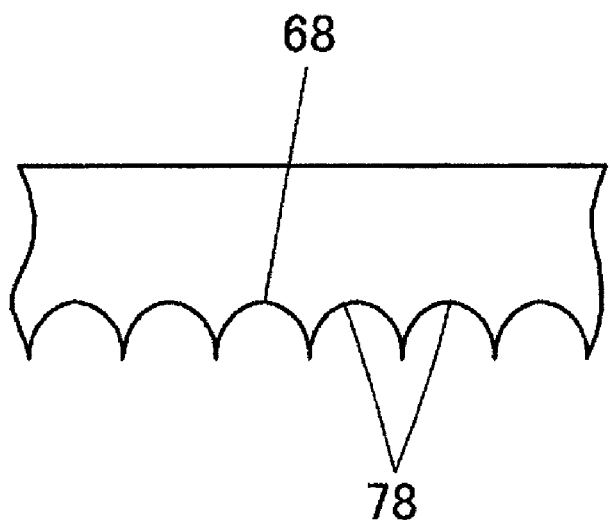
FIG. 32B is an enlarged sectional view of a directivity converting pattern according to the fifth embodiment of the present invention.
Figure 33A:
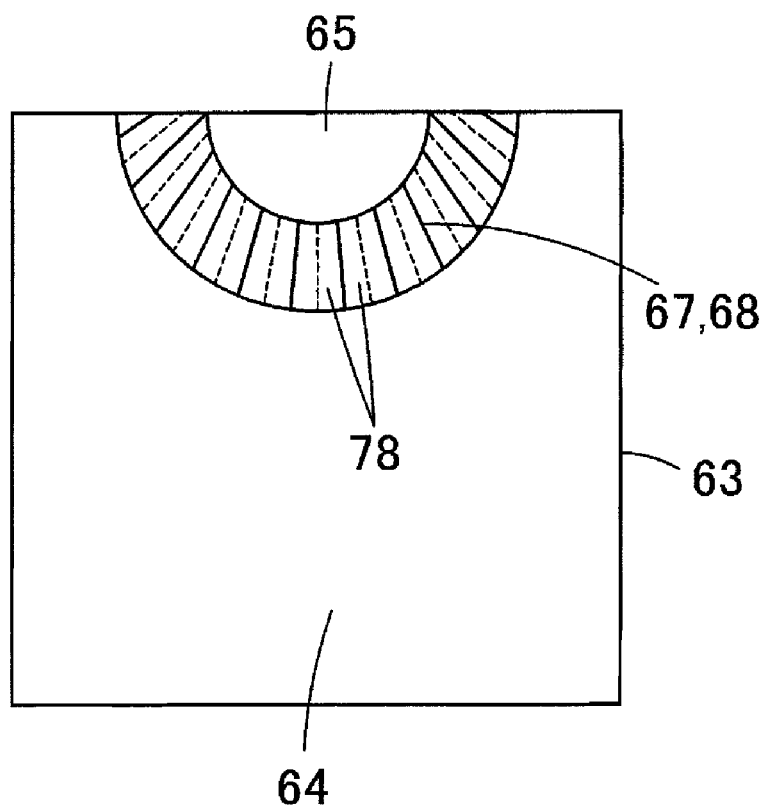
FIG. 33A is a schematic plan view of a light guide plate provided with another directivity converting pattern according to the fifth embodiment of the present invention.
Figure 33B:
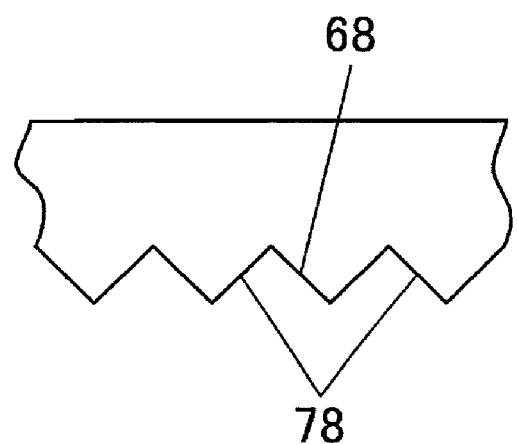
FIG. 33B is an enlarged sectional view of the directivity converting pattern according to the fifth embodiment of the present invention.
Figure 34A:
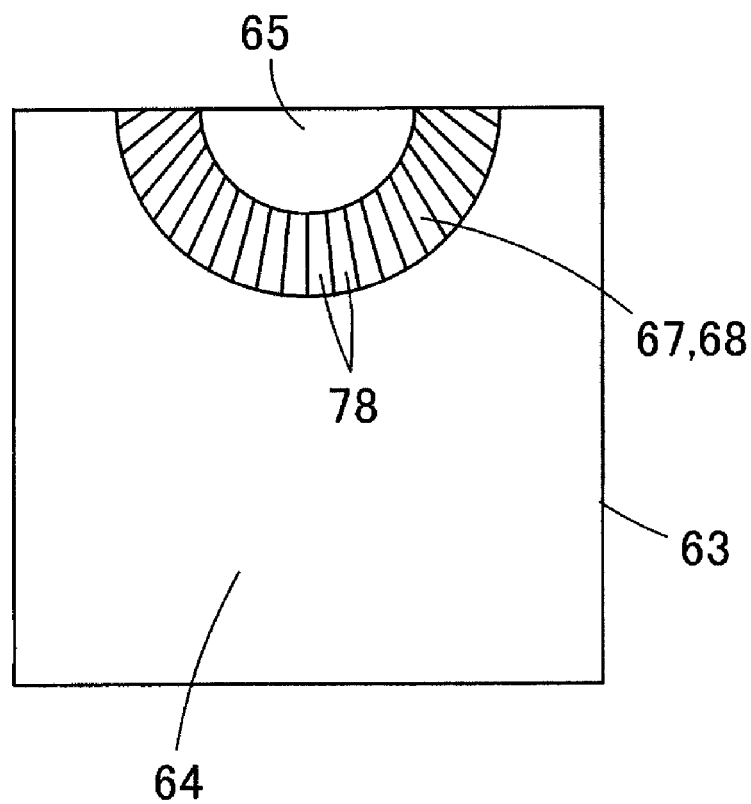
FIG. 34A is a schematic plan view of the light guide plate provided with still another directivity converting pattern according to the fifth embodiment of the present invention.
Figure 34B:
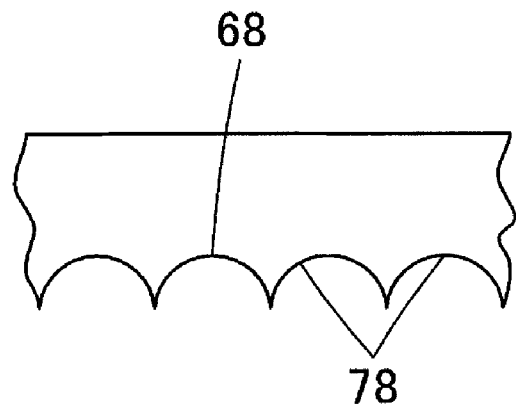
FIG. 34B is an enlarged sectional view of the directivity converting pattern according to the fifth embodiment of the present invention.
Figure 35A:
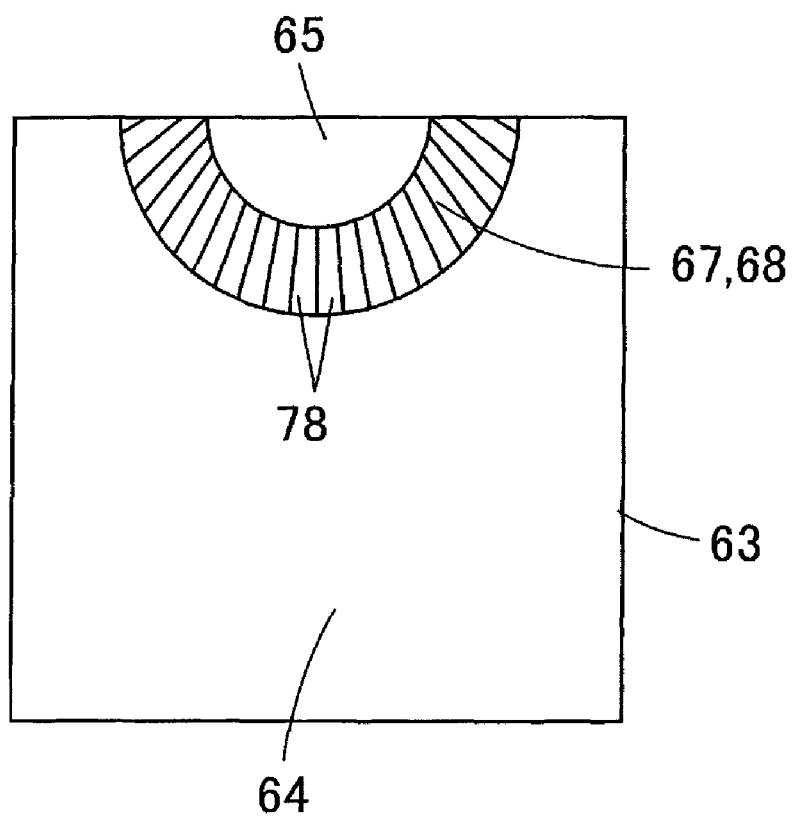
FIG. 35A is a schematic plan view of the light guide plate provided with still another directivity converting pattern according to the fifth embodiment of the present invention.
Figure 35B:
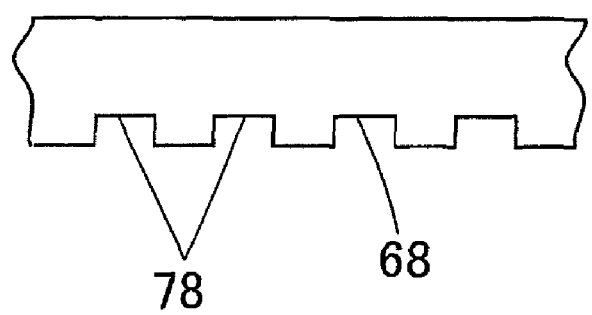
FIG. 35B is an enlarged sectional view of the directivity converting pattern according to the fifth embodiment of the present invention.
Figure 36:
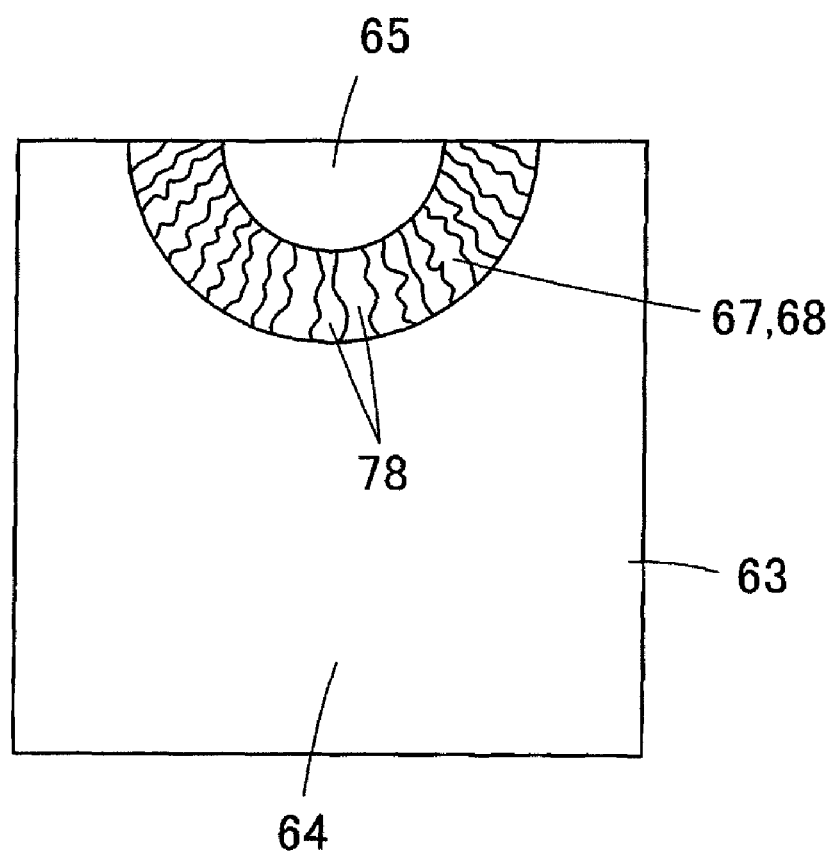
FIG. 36 is a schematic plan view of a light guide plate provided with still another directivity converting pattern according to the fifth embodiment of the present invention.

Such an embodiment includes, for example, ones shown in FIGS. 32A, 32B to FIG. 36. FIGS. 32A and 32B show a directivity converting pattern 68 configured such that recessed/projecting structures 78 (unit patterns) each of which has the shape of a cylindrical lens or an elliptical groove (a surface of elliptical sphere) are arranged radially from a point positioned behind the light source center of the point light source 62 so as to make longitudinal directions of the respective recessed/projecting structures 78 approximately parallel to the light source direction. FIGS. 33A and 33B show a directivity converting pattern 68 configured such that recessed/projecting structures 78 each of which has the shape of a V-shaped groove are arranged radially from a point positioned behind the light source center of the point light source 62 so as to make longitudinal directions of the respective recessed/projecting structures 78 approximately parallel to the light source direction. FIGS. 34A and 34B show a directivity converting pattern 68 configured such that recessed/projecting structures 78 each of which has the shape of a U-shaped groove are arranged radially from a point positioned behind the light source center of the point light source 62 so as to make longitudinal directions of the respective recessed/projecting structures 78 approximately parallel to the light source direction. FIGS. 35A and 35B show a directivity converting pattern 68 configured such that recessed/projecting structures 78 each of which has the shape of a diffraction grating are arranged radially from a point positioned behind the light source center of the point light source 62 so as to make longitudinal directions of the respective recessed/projecting structures 78 approximately parallel to the light source direction. FIG. 36 shows a directivity converting pattern 68 configured such that recessed/projecting structures 78 each of which is meandering as viewed from the direction perpendicular to the light exit face are arranged radially from a point positioned behind the light source center of the point light source 62 so as to make longitudinal directions of the respective recessed/projecting structures 78 approximately parallel to the light source direction.

Another embodiment may be configured like the second embodiment shown in FIG. 19 using such a recessed/projecting structure 78 as shown in FIGS. 32A and 32B to FIG. 36. That is, an embodiment may be configured such that, when viewed from the direction perpendicular to the light exit face 69, the directivity converting pattern 68 positioned within the region which light that has entered the light guide plate 63 from the light entering end face 66 reaches is formed in an arc shape, and the center of an inscribed circle of the directivity converting pattern 68 coincides with the light source center C. Further, a point at which the longitudinal axis 73 of the recessed/projecting structure 78 in the directivity converting pattern 68 intersects with the centerline 75 may be configured to be positioned closer to the light source center C of the point light source 62 as the distance of the recessed/projecting structure 78 from the centerline 75 increases.

Further, unit patterns, such as V-shaped groove structures or recessed/projecting structures, may be irregular or random in shape or size, as shown in the embodiment in FIG. 32 or FIG. 36, or plural kinds of unit patterns may coexist.

Note that, though not shown herein, the directivity converting pattern may be formed on the face opposite to the light exit face of the light guide plate, as shown in FIG. 44 to FIG. 55 in the patent document 4. Further, the inclined face may also be formed on the face opposite to the light exit face of the light guide plate. Further, as shown in FIG. 53D in the patent document 4, the inclined face and the directivity converting pattern may be provided on both the face on the same side as the light exit face of the light guide plate and the face on the opposite side thereto.

REFERENCE MARKS ON THE DRAWINGS

61 surface light source device
62 point light source
62*a* light exit window
62*b* LED
63 light guide plate
64 light guide plate body
65 light introducing portion
66 light entering end face
67 inclined face
68 directivity converting pattern
69 light exit face
70 light emitting means
71 V-shaped groove structure
73 longitudinal axis
74 inscribed circle
75 centerline While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A surface light source device, comprising:
a point light source; and
a light guide plate which introduces light of the point light source therein from a light entering face and emits the same outward from a light exit face,
wherein the point light source is provided at a position facing the light entering face of the light guide plate,
wherein the light guide plate comprises:
  a light introducing portion for confining the light from the point light source that has entered from the light entering face; and
  a light guide plate body which is thinner than a maximum thickness of the light introducing portion, which is so provided as to be continuous with the light introducing portion, and which causes a light exit means to emit the confined light from the light exit face outward,
wherein the light introducing portion has an inclined face on a face on a light exit side of the light guide plate or the opposite face thereof, wherein the inclined face is inclined to an end of a surface of the light guide plate body from a surface of a portion thicker than the light guide plate body, wherein the light guide plate has a directivity converting pattern on the face on the light exit side or the opposite face, wherein the directivity converting pattern is for converting a directional expansion in a thickness direction of the light guide plate of the light that has entered the light introducing portion into a directional characteristic that has been inclined to a direction parallel to a planer direction of the light guide plate, wherein the directivity converting pattern is comprised of an arrangement of a plurality of unit patterns of recesses or projections, each of which extends in one direction, and wherein when the light guide plate is viewed from a direction perpendicular to the light exit face, both a first point of intersection at which a first straight line obtained by averaging respective longitudinal axes of the unit patterns which is located within a region which the light which has entered the light guide plate from the light entering face reaches and on one side of the centerline and a second point of intersection at which a second straight line obtained by averaging respective longitudinal axes of the unit patterns which is located within a region which the light which has entered the light guide plate from the light entering face reaches and on the other side of the centerline are located behind a light source center of the point light source.

2. A surface light source device according to claim 1,
wherein a distance between the first point of intersection and the light source center is equal to or less than six times a width of a light exit window of the point light source, and
wherein a distance between the second point of intersection and the light source center is equal to or less than six times the width of the light exit window of the point light source.

3. A surface light source device according to claim 1,
wherein the first point of intersection and the second point of intersection coincide with each other.

4. A surface light source device according to claim 1,
wherein, when the light guide plate is viewed from the direction perpendicular to the light exit face, the longitudinal axes of the respective unit patterns located in the region which the light that has entered the light guide plate from the light entering face reaches converge near a point located behind the light source center of the point light source.

5. A surface light source device according to claim 1,
wherein, when the light guide plate is viewed from the direction perpendicular to the light exit face, all points at which the longitudinal axes of the respective unit patterns located in the region which the light that has entered the light guide plate from the light entering face reaches intersect with the centerline are located behind the light source center of the point light source.

6. A surface light source device according to claim 1,
wherein, when the light guide plate is viewed from the direction perpendicular to the light exit face, distances between points at which the longitudinal axes of the respective unit patterns located in the region which the light that has entered the light guide plate from the light entering face reaches intersect with the centerline and the light source center are equal to or less than six times a width of a light exit window of the point light source.

7. A surface light source device according to claim 1,
wherein, when the light guide plate is viewed from the direction perpendicular to the light exit face, points at which the longitudinal axes of the unit patterns located in the region which the light that has entered the light guide plate from the light entering face reaches intersect with the centerline are closer to the light source center of the point light source as the unit patterns have farther distances from the centerline.

8. A surface light source device according to claim 7,
wherein, when the light guide plate is viewed from the direction perpendicular to the light exit face, the directivity converting pattern located in the region which the light that has entered the light guide plate from the light entering face reaches is formed in an arc-like shape; and
wherein a center of an inscribed circle of the directivity converting pattern formed in an arc-like shape coincides with the light source center of the point light source.

9. A surface light source device according to claim 1,
wherein, when the light guide plate is viewed from the direction perpendicular to the light exit face, the longitudinal axes of the respective unit patterns located in the region which the light that has entered the light guide plate from the light entering face reaches pass through a point on the centerline behind the light source center of the point light source.

10. A surface light source device according to claim 1,
wherein, when the light guide plate is viewed from the direction perpendicular to the light exit face, the directivity converting pattern located in the region which the light that has entered the light guide plate from the light entering face reaches is formed in an arc-like shape,
wherein the directivity converting pattern is formed such that an inscribed circle of the directivity converting pattern passes through both ends of a light exit window of the point light source, and
wherein the unit patterns located in the region which the light that has entered the light guide plate reaches are disposed such that the respective longitudinal axes thereof pass through a point of intersection between the centerline of the point light source and the inscribed circle.

* * * * *